(12) United States Patent
Hickey

(10) Patent No.: US 12,077,062 B2
(45) Date of Patent: Sep. 3, 2024

(54) METHOD AND SYSTEM FOR AUTOMATICALLY CONNECTING AND DISCONNECTING BATTERIES FOR ELECTRIC VEHICLES

(71) Applicant: Artisan Vehicle Systems, Inc., Camarillo, CA (US)

(72) Inventor: Kyle Hickey, Moorpark, CA (US)

(73) Assignee: ARTISAN VEHICLE SYSTEMS, INC., Camarillo, CA (US)

( * ) Notice: Subject to any disclaimer, the term of this patent is extended or adjusted under 35 U.S.C. 154(b) by 0 days.

(21) Appl. No.: 18/176,835

(22) Filed: Mar. 1, 2023

(65) Prior Publication Data

US 2023/0202341 A1    Jun. 29, 2023

Related U.S. Application Data

(63) Continuation of application No. 17/033,971, filed on Sep. 28, 2020, now Pat. No. 11,597,294.

(51) Int. Cl.
*B60K 1/04* (2019.01)
*B60L 50/60* (2019.01)
*B60L 53/16* (2019.01)
*B60L 53/35* (2019.01)
(Continued)

(52) U.S. Cl.
CPC ............... *B60L 53/80* (2019.02); *B60L 50/66* (2019.02); *B60L 53/16* (2019.02); *B60L 53/35* (2019.02); *H01M 50/20* (2021.01); *H01M 2220/20* (2013.01)

(58) Field of Classification Search
CPC .......... B60L 53/80; B60L 53/35; B60L 50/66; B60L 53/16; H01M 50/20; H01M 2220/20; B60K 1/04
See application file for complete search history.

(56) References Cited

U.S. PATENT DOCUMENTS

| | | |
|---|---|---|
| 4,397,365 A | 8/1983 | Harbe |
| 5,163,537 A | 11/1992 | Radev |
| 5,275,525 A | 1/1994 | Grumblatt |

(Continued)

FOREIGN PATENT DOCUMENTS

JP    2014203628 A    10/2014

OTHER PUBLICATIONS

International Search Report and Written Opinion dated Jan. 4, 2022, for PCT/US2021/052139 filed Sep. 27, 2021; 13 pp.

*Primary Examiner* — Jason D Shanske
*Assistant Examiner* — James J Triggs
(74) *Attorney, Agent, or Firm* — Plumsea Law Group, LLC

(57) ABSTRACT

An automated connection and disconnection system for a battery assembly is disclosed. The system may be implemented by a first component of an electric vehicle and a second component of the battery assembly. The first component includes a linear actuator that is configured to push a set of electrical connectors associated with the electric vehicle outward and establish a connection with a corresponding set of electrical connectors associated with the battery assembly. The process of connecting or docking the battery assembly to the electric vehicle is thereby automated and the time needed to exchange batteries is reduced. The system further includes provisions for ensuring the two components remain aligned relative to one another during docking.

18 Claims, 16 Drawing Sheets

(51) Int. Cl.
   *B60L 53/80* (2019.01)
   *H01M 50/20* (2021.01)

(56) References Cited

U.S. PATENT DOCUMENTS

| | | |
|---|---|---|
| 5,305,513 A | 4/1994 | Lucid |
| 5,598,083 A | 1/1997 | Gaskins |
| 5,612,606 A | 3/1997 | Guimarin et al. |
| 5,879,125 A | 3/1999 | Odell |
| 6,113,342 A | 9/2000 | Smith |
| 6,631,775 B1 | 10/2003 | Chaney |
| 6,938,553 B2 | 9/2005 | Tamaki |
| 7,828,099 B2 | 11/2010 | Heckeroth |
| 8,146,694 B2 | 4/2012 | Hamidi |
| 8,191,688 B2 | 6/2012 | Bogelein et al. |
| 8,714,291 B2 | 5/2014 | Riach |
| 9,358,895 B2 | 6/2016 | Avganim |
| 9,583,749 B2 | 2/2017 | Okuyama |
| 2001/0013437 A1 | 8/2001 | Husted et al. |
| 2008/0006459 A1* | 1/2008 | Niebuhr ............... B66F 9/0754 180/68.5 |
| 2011/0070475 A1 | 3/2011 | Thomas |
| 2013/0156533 A1* | 6/2013 | Yu ....................... H01M 50/244 414/729 |
| 2019/0263242 A1 | 8/2019 | Huff et al. |
| 2020/0156500 A1 | 5/2020 | Huff et al. |
| 2020/0384969 A1 | 12/2020 | Huff et al. |
| 2022/0097554 A1 | 3/2022 | Hickey |

\* cited by examiner

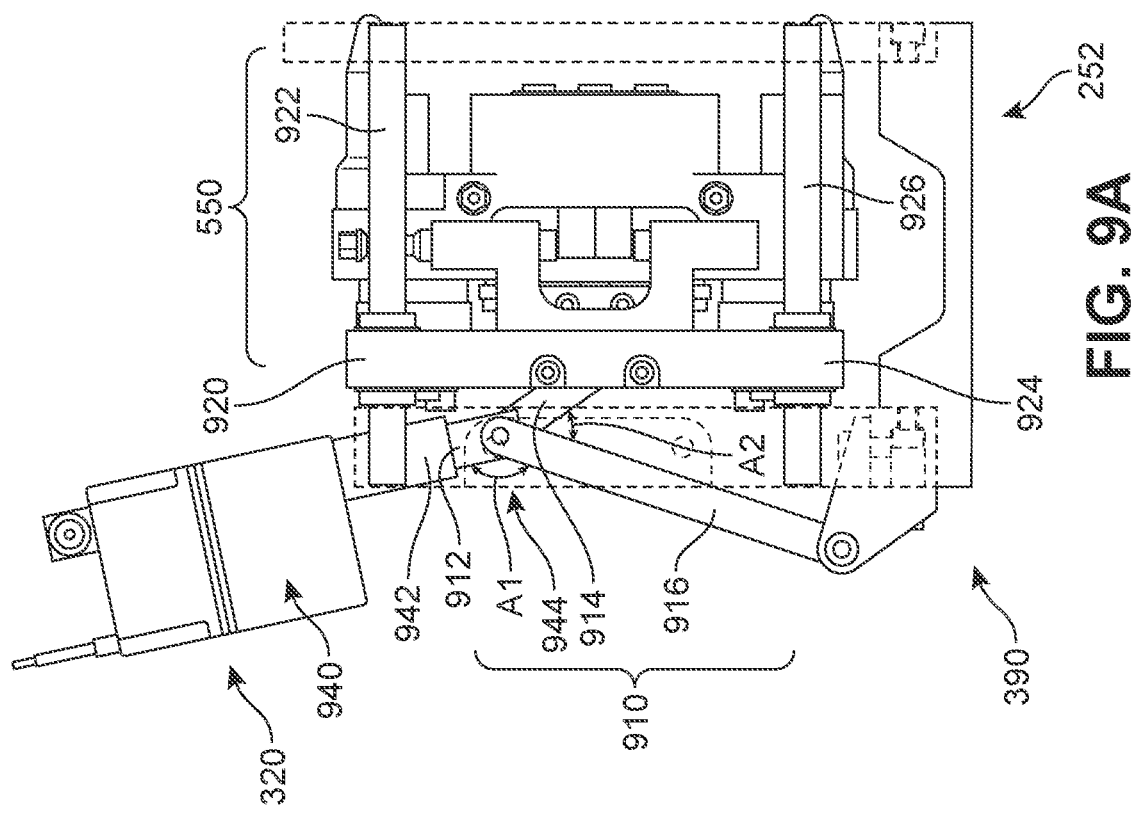

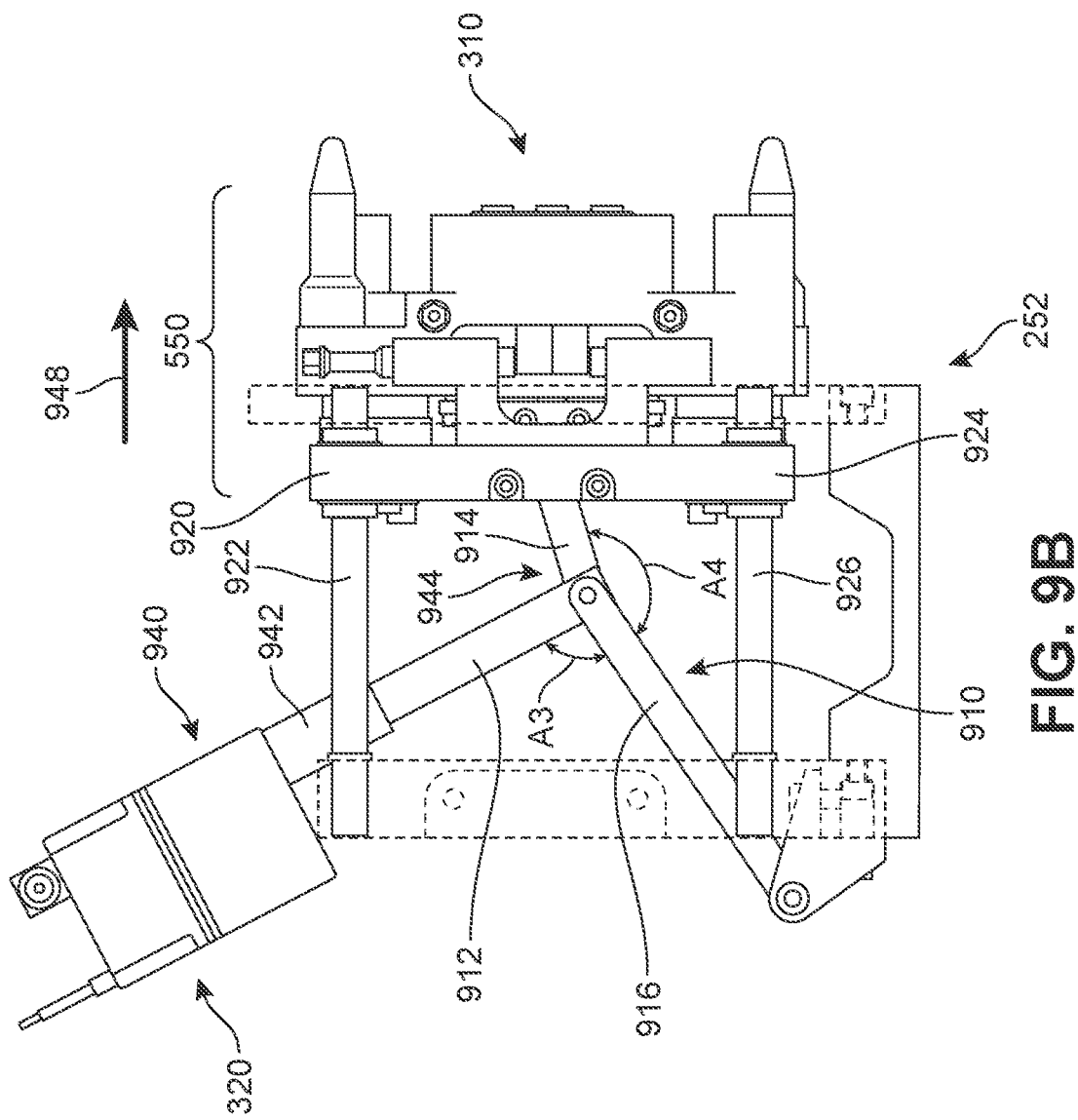

METHOD AND SYSTEM FOR AUTOMATICALLY CONNECTING AND DISCONNECTING BATTERIES FOR ELECTRIC VEHICLES

REFERENCE TO RELATED APPLICATION

This application is a continuation of co-pending application Ser. No. 17/033,971, filed Sep. 28, 2020, the contents of which is hereby incorporated by reference in its entirety.

BACKGROUND OF THE INVENTION

The present invention relates generally to mining vehicles.

Various types of mining vehicles may be used to remove and transport material in a mining operation. One type of vehicle, a loader, may be used. Traditional loaders may operate with diesel-powered engines. Diesel powered loaders can have different loading capacities.

Electric vehicles may operate with one or more electric motors powered by batteries. Batteries in electric vehicles, such as cars and other kinds of vehicles, may be large and heavy. More specifically, electric loaders and LHD (load, haul, dump) machines such as those with capacity of four tons or greater, depend on batteries that are bulky and have an irregular exterior structure. Disconnecting and reconnecting batteries may require external infrastructure such as cranes, lifts or other systems as well as multiple manual steps.

SUMMARY OF THE INVENTION

Various embodiments of a mining vehicle are disclosed. The embodiments provide mining vehicles that are battery powered rather than diesel powered.

In one aspect, a battery docking component for an electric vehicle includes a body portion including a forward-facing surface, the forward-facing surface comprising a male interface configured to connect to a female interface of a battery assembly. The battery docking component also includes a linear actuator comprising a linear actuator and a linkage assembly that is disposed behind and movably connected to the body portion, the linear actuator being configured to push the body portion distally outward in order to automatically connect the male interface to the female interface.

In another aspect, a battery docking system includes a first docking component connected to an electric vehicle and a second docking component connected to a battery assembly. The first docking component includes a body portion including a male interface configured to connect to a female interface of a battery assembly. The male interface further includes a first set of electrical connectors, and a linear actuator. In addition, the second docking component includes a female interface configured to connect to the male interface. The female interface further includes a second set of electrical connectors. Furthermore, the first set of electrical connectors is configured to automatically connect to the second set of electrical connectors when the linear actuator transitions from a retracted state to an extended state during docking.

In another aspect, a method of automatically connecting a battery assembly to an electric vehicle includes a first step of receiving a request to perform an automated docking operation, and a second step of causing, in response to the request, a linear actuator to transition from a retracted state to an extended state, thereby pushing a body portion of the electric vehicle distally outward. In addition, the method includes a third step of automatically connecting a first set of electrical connectors disposed on the body portion to a second set of electrical connectors disposed on the battery assembly, thereby providing power to the electric vehicle.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 9A and 9B depict an embodiment of a linear actuator causing a body portion of the active component to travel forward;

DETAILED DESCRIPTION

Figure 1:
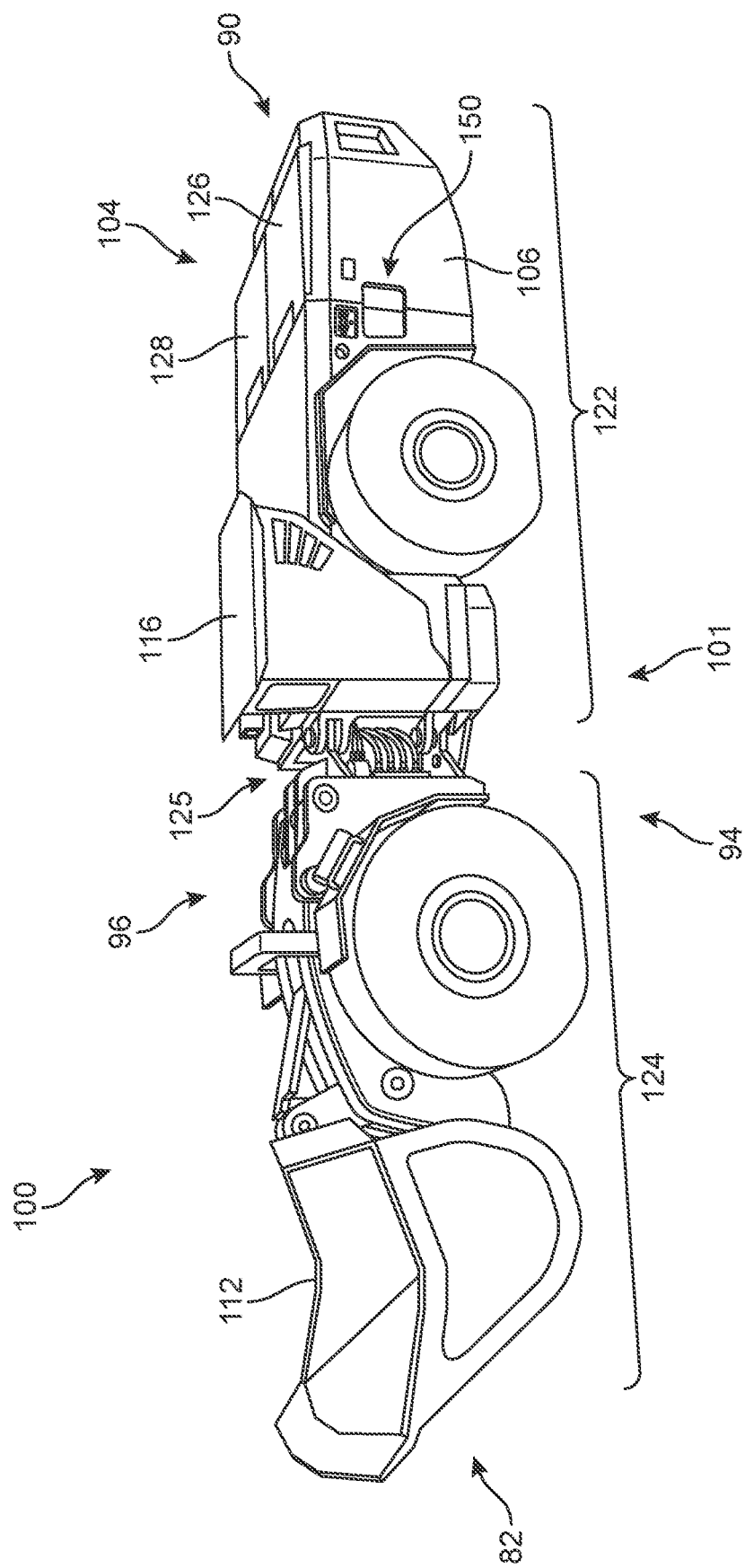
FIG. 1 shows a schematic view of an embodiment of a mining vehicle docked to a battery assembly.

The present disclosure is directed to an automated mechanism for the connection and disconnection of a battery to an electric-powered vehicle. As will be discussed in further detail below, the proposed embodiments provide a battery connection system configured to automatically connect and disconnect a battery assembly from a vehicle. Such a system can considerably reduce the time needed for a battery swap to occur. It is desirable to have a system that can efficiently swap out discharged batteries with fully charged batteries so that vehicles are not idle for long periods as they wait for recharging. In particular, by implementation of the proposed systems, an operator of the vehicle is no longer required to manually connect and/or disconnect the battery assembly from the vehicle. The proposed systems significantly reduce the time needed to 'swap' one battery assembly for another. For example, automation of the connection process reduces the number of times an operator must exit and re-enter the cab throughout the process, while also greatly improving the overall efficiency of the operation.

In traditional battery swap scenarios, an operator is typically required to engage in a number of manual steps. For example, in many cases the operator must: (a) exit the vehicle cabin; (b) walk to the portion of the vehicle on which the depleted battery assembly is mounted; (c) disconnect the battery assembly manually; (d) return to the vehicle cabin; (e) dismount the battery assembly; (f) move the vehicle to the new (charged or fresh) battery assembly; (g) cause the new battery assembly to be mounted; (h) exit the vehicle cabin; (i) walk to the newly mounted battery assembly and manually connect the fresh battery assembly; and (j) return to the vehicle cabin. These steps must occur before the vehicle is ready to return to normal operation. In some cases, the operator must apply some effort to align the cables.

The proposed embodiments describe a system by which some or all of these steps may be automated, providing for a modular, hands-free mechanism of battery exchange in a challenging environment. As discussed in detail below, the mechanism comprises a vehicle-side module ("active component") hard-wired to the cabling for the vehicle and a battery-side module ("passive component") hard-wired to the cabling of the battery assembly. Each side is configured to align and dock together to electrically connect in an automated fashion without manual intervention. In different embodiments, the mechanism includes provisions for the two components to securely and automatically mate and provide an electrical connection as well as for the two components to be automatically disconnected and pulled apart. In one embodiment, the active portion is electrically actuated and includes a linkage to ensure positive engagement. Thus, the proposed embodiments offer a solution to the problem of requiring an operator to disconnect a battery from the vehicle, and connect a fresh battery to the vehicle manually. In some embodiments, the active component can be modular, and refer to a component that can be installed and removed and/or replaced from the vehicle when desired; similarly, in some embodiments, the passive component may also be modular and readily removed and/or replaced from the battery assembly when desired.

As noted above, the proposed embodiments are directed to a battery connection system for a vehicle. The vehicle is zero emissions electric vehicle and uses only a battery to power the vehicle in place of a conventional diesel engine. For purposes of example, the proposed systems and methods will be described with respect to a mining vehicle. The vehicle may be used in mining operations. In some embodiments, the vehicle is a loader or an LHD (load, haul, dump) machine. For example, the loader may have a loading capacity of a few tons, or greater ranging from 10-tons and above. The vehicle presented for purposes of illustration in FIGS. 1 and 2 has an 18-ton capacity. However, embodiments of the connection system may be implemented with various batteries configured for use with a wide range of electric vehicles and vehicle capacities.

Furthermore, it should be understood that in different embodiments the proposed systems and methods may be used with other types of electric-powered vehicle, including automobiles and other motorized vehicles, such as cars, trucks, airplanes, and motorcycles. The embodiments include various provisions that enable a vehicle to connect and disconnect to a removable battery pack.

The mining vehicle described herein is a heavy duty industrial electric vehicle designed to operate in a continuous work environment such as a sub-surface mine. An overview of a sub-surface mine environment and general description of electric vehicles and electric power systems for sub-surface mining are described in co-pending application Ser. No. 15/133,478 filed on Apr. 20, 2016, titled "System And Method For Providing Power To A Mining Operation," the entire contents of which are hereby incorporated by reference. Electric mining vehicles are powered by at least one heavy-duty, high-powered battery pack which is comprised of multiple battery modules contained in a pack housing. Each module is comprised of multiple cells. The modules may be equipped with an array of operational sensors and may be provided with electronic components to provide data from the sensors to a separate maintenance network. Sensors can include temperature sensors, timing devices, charge level detection devices, and other monitoring devices which can be employed to provide an operations center with accurate, real-time data regarding the performance of the module and its performance history. Details of these types of battery packs and the associated data generation and monitoring can be found in U.S. patent application Ser. No. 14/494,138 filed on Sep. 23, 2014, titled "Module Backbone System;" application Ser. No. 14/529,853 filed Oct. 31, 2014, titled "System and Method for Battery Pack Charging and Remote Access;" and application Ser. No. 14/721,726 filed May 26, 2015, titled "Module Maintenance System;" the entire contents of which are hereby incorporated by reference. In other embodiments, different battery assemblies configured for use by other types of vehicles may be incorporated for use by the proposed systems.

FIG. 1 illustrates a schematic isometric view of a vehicle 100. As a general matter, vehicle 100 may be comprised of a frame 101 (or chassis), a set of wheels 110 and a bed 112. Bed 112 may be coupled with frame 101 and may be tilted between a lowered position (shown in FIG. 1) and a raised position during operation. For reference, vehicle 100 is also characterized as having a front end 90, a rearward end 92, a first side 94 and an opposite-facing second side 96. Vehicle 100 is also provided with various standard vehicular provisions, such as cab 116 for receiving one or more operators. In some embodiments, vehicle 100 may be divided into a first frame portion 122 and a second frame portion 124. First frame portion 122 may be a front portion associated with cab 116. Second frame portion 124 may be a rearward portion associated with bed 112. In some embodiments, a mechanical linkage 125 connects first frame portion 122 and second frame portion 124 so that the two portions can move relative to one another (e.g., swivel or pivot).

Vehicle 100 also includes a propulsion system comprising one or more electric motors that are powered by one or more batteries. In some embodiments, vehicle 100 may include at least two electric motors for powering each pair of wheels. In some embodiments, vehicle 100 may include four electric motors, where each motor independently powers one of four wheels. It may be appreciated that the exact locations of each motor may vary from one embodiment to another.

Some embodiments may also be equipped with an auxiliary motor (not shown). In some embodiments, an auxiliary motor may be used to drive other sub-systems of vehicle 100, such as a mechanical system that may be used to mount and dismount batteries. Optionally, in other embodiments an auxiliary motor may not be used.

Embodiments can incorporate one or more batteries to power set of motors and/or an auxiliary motor. As used herein, the term "battery pack" generally refers to multiple battery modules in a heavy-duty pack housing. Each module is comprised of multiple battery cells. In this way, a battery pack also refers to a collection of individual battery cells. The battery cells, and therefore modules, are functionally interconnected together as described in the previously incorporated pending applications.

In different embodiments, a battery pack could incorporate any suitable kind of battery cell. Examples of battery cells include capacitors, ultra-capacitors, and electrochemical cells. Examples of electrochemical cells include primary (e.g., single use) and secondary (e.g., rechargeable). Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. A battery cell may have various voltage levels. In particular, in some cases two different battery cells in a battery pack could have different voltage levels. Similarly, the battery cell may have various energy capacity levels. In particular, in some cases, two different battery cells in a battery pack could have different capacity levels.

In some cases, it may be desirable to use multiple battery packs. As used herein, the term "battery pack assembly", or simply "battery assembly" refers to a set of two or more battery packs. In some embodiments, a battery assembly may also include a cage or similar container for holding the separate battery packs together.

As seen in FIG. 1, vehicle 100 is configured with a primary battery assembly ("battery assembly") 104. In some embodiments, primary battery assembly 104 may be located at front end 90. In one embodiment, primary battery assembly 104 may be disposed near to cab 116, which is located along the first frame portion 122 and on first side 94 of vehicle 100. In some embodiments, primary battery assembly 104 comprises two battery packs. These include a first battery pack 126 and a secondary battery pack 128. The first battery pack 126 and second battery pack 128 may be retained within an interior cavity in a battery cage 106. In other embodiments, the primary battery assembly 104 includes only one battery pack, or more than two battery packs.

In different embodiments, vehicle 100 may also include an auxiliary battery pack. The auxiliary battery pack may be disposed in a separate location from primary battery assembly 104. As discussed below, auxiliary battery pack may be used to power vehicle 100 while the primary battery assembly is being swapped. Auxiliary battery pack may also be referred to as a "tramming battery". As seen in FIG. 1, primary battery assembly 104 is exposed on an exterior of vehicle 100. Specifically, various exterior surfaces of the battery cage 106 that serves as an outer housing and contains one or more battery packs may comprise part of the exterior of vehicle 100 when the assembly is mounted on the vehicle. In contrast, the auxiliary battery pack can be an internal battery and is retained within the chassis of vehicle 100.

In different embodiments, battery assembly 104 may be removably attached to vehicle 100. As used herein, the term "removably attached" refers to two components that are joined together but that can be separated without destroying one or the other component. That is, the components can be non-destructively detached from one another. Exemplary modalities of "removable attachment" include connections made using removeable fasteners, latches, locks, hooks, magnetic connections as well as other kinds of connections.

In contrast, an auxiliary battery pack may be "fixedly attached" to vehicle 100. For example, an auxiliary battery pack may not be separated from vehicle 100 without requiring part of vehicle 100 to be disassembled and/or without destroying one or more parts. However, in other embodiments, the auxiliary battery may also be removably attached.

The embodiments may provide a zero emissions electric vehicle with comparable hauling capacity to similarly sized diesel-powered vehicles. In discussing the form factor of a vehicle, the description discusses the overall length, overall width, and overall height of a vehicle, as well as various other dimensions. As used herein, the term overall length refers to the distance between the forward-most location on a vehicle and the rearward-most location on the vehicle. In some cases, the forward-most location may be a located on the cab or battery assembly. The term overall width refers to the distance between opposing sides of the vehicle, and is measured at the "outermost" locations along the opposing sides. The term overall height refers to the distance between the lowest point of a vehicle (usually the bottom of the wheels) and the highest point of a vehicle.

Each of these vehicle dimensions may correspond with an axis or direction of vehicle 100. That is, the overall length of vehicle 100 may be taken along a lengthwise direction (or axis) of vehicle 100. The overall width of vehicle 100 may be taken along a widthwise direction (or axis) of vehicle 100. Also, the overall height of vehicle 100 may be taken along a height-wise direction (or axis) of vehicle 100.

Embodiments can include a system for mounting and dismounting one or more battery packs. For example, vehicle 100 may incorporate an onboard mounting and dismounting system. The mounting and dismounting system may include all the necessary components required to lift and lower primary battery assembly 104. As noted above, in order for the battery pack to provide power to vehicle 100, the battery pack must be electrically connected to the vehicle. For example, in some embodiments each battery pack of primary battery assembly 104 may power a different set of motors (and accordingly, a different set of wheels). In some cases, each battery pack may power a pair of motors on a particular axle (e.g., front axle or rear axle). In one embodiment, first battery pack 200 may be connected via a power cable to components on a front axle assembly. In one example, first battery pack 126 may provide power to both a first electric motor and a second electric motor to power a front set of wheels. Likewise, the second battery pack 128 may be connected via a power cable to components of a rear axle assembly. For example, second battery pack 128 may provide power to both a third electric motor and to fourth electric motor to power a rear set of wheels. By powering the front and rear axles using separate battery packs, the amount of power required that must be delivered to a single source is reduced. This may allow for the use of smaller power cables (or cables with a lower current rating) that are easier to manage and/or less likely to fail. In other embodiments, the battery pack(s) may be managed to power various components of the vehicle in other arrangements.

As noted earlier, the proposed systems and methods provide an automated connection and disconnection mechanism ("connection mechanism") by which the primary battery assembly 104 may be connected and/or disconnected to the vehicle 100. An exterior view of an example of a connection system 150 can be seen in FIGS. 1 and 2. The components comprising the connection system 150 will be discussed in greater detail with reference to the drawings below.

Figure 2:
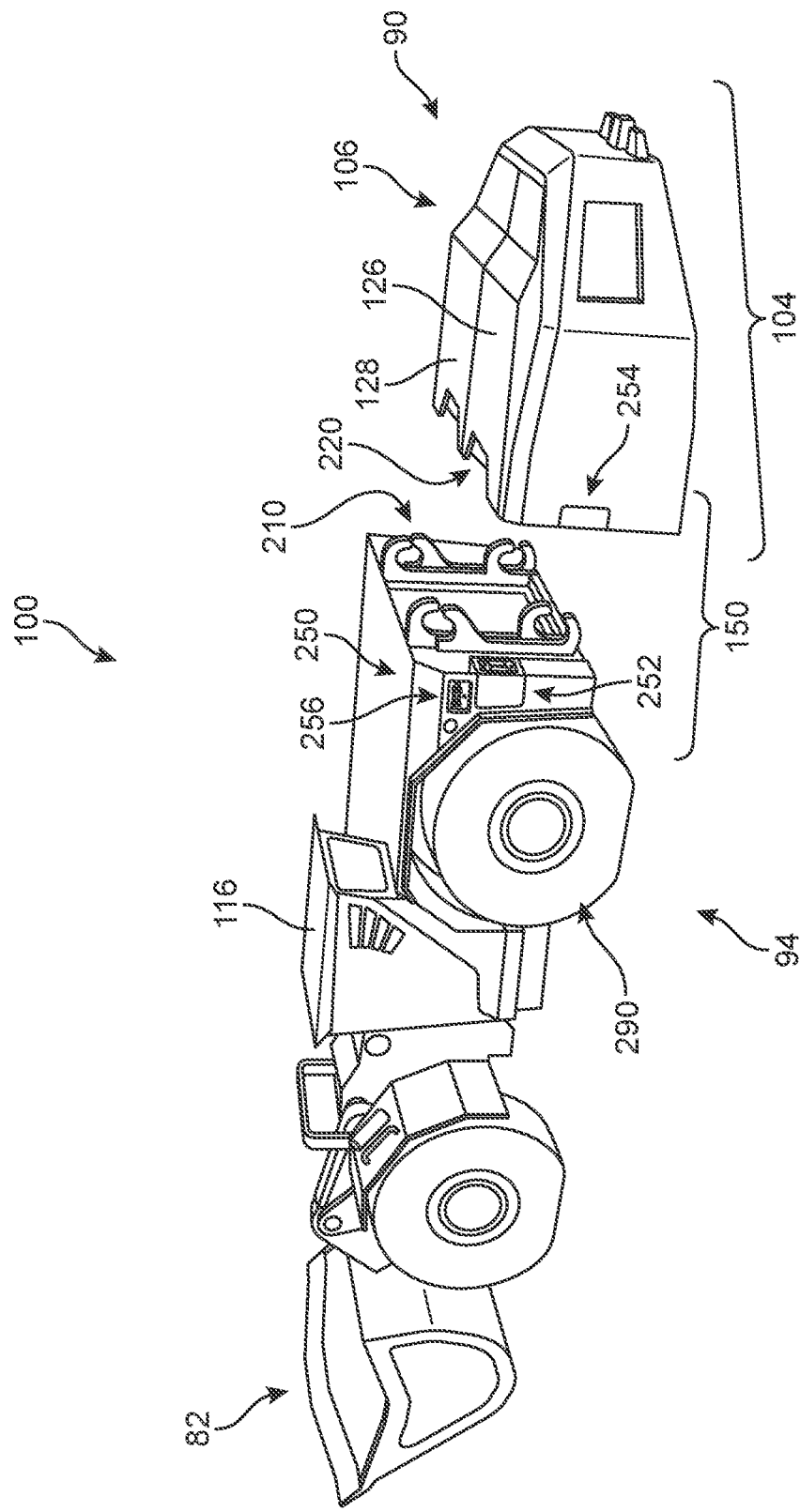
FIG. 2 shows a schematic side view of an embodiment of a mining vehicle un-docked from a battery assembly.

As seen in FIG. 1, battery assembly 104 is mounted on the front end 90 of vehicle 100. In other embodiments, the vehicle 100 may be configured to dock with battery assembly 104 on the rear end or sides of vehicle 100. In the current embodiment, outer cage 106 (i.e., housing) of primary battery assembly 104 is docked onto a forward-facing portion of vehicle adjacent to where cab 116 is disposed. Moreover, with battery assembly 104 mounted to vehicle 100, battery assembly 104 forms parts the forward surfaces of vehicle 100. FIG. 2 depicts an isometric view of vehicle 100 where the battery assembly 104 has been dismounted and separated from vehicle 100. When battery assembly 104 is dismounted, the vehicle 100 includes an exposed forward-facing surface 210 along the front surface of vehicle 100.

Thus, when a battery assembly is removed from vehicle 100, the geometry of its exterior surface changes since the walls of the battery assembly form a part of the vehicle's exterior surface when mounted. In addition, the battery assembly 104 includes an exposed rearward-facing surface 220, where the rearward-facing surface 220 and forward-facing surface 210 are designed to face one another during mounting and connection. By placing the primary battery assembly on the exterior of vehicle 100, it may be easier to mount and dismount the battery compared to electric vehicles with internally located batteries. Moreover, the battery cage can simultaneously provide structural support for containing the battery packs as well as provide structural support on an exterior of the vehicle.

As noted above, in different embodiments, the connection system 150 includes an active component 252 and a passive component 254, each of which will be described in greater detail below. The active component is referred to as active due to its behavior during the docking and un-docking operations (see FIGS. 9A and 9B), while the passive component remains relatively static during the docking and un-docking operations. In the embodiment of FIG. 2, the active component 252 is disposed along a peripheral corner portion 250 of the vehicle 100. For example, the peripheral corner portion 250 can be disposed along an outermost forward edge of the vehicle 100 near or directly adjacent to a forward axle 290. In one embodiment, a control panel 256 can also be included along the outer surface of the peripheral corner portion 250 that can provide an operator with the ability to modify the operation of the automated system, if so desired.

Figure 3:
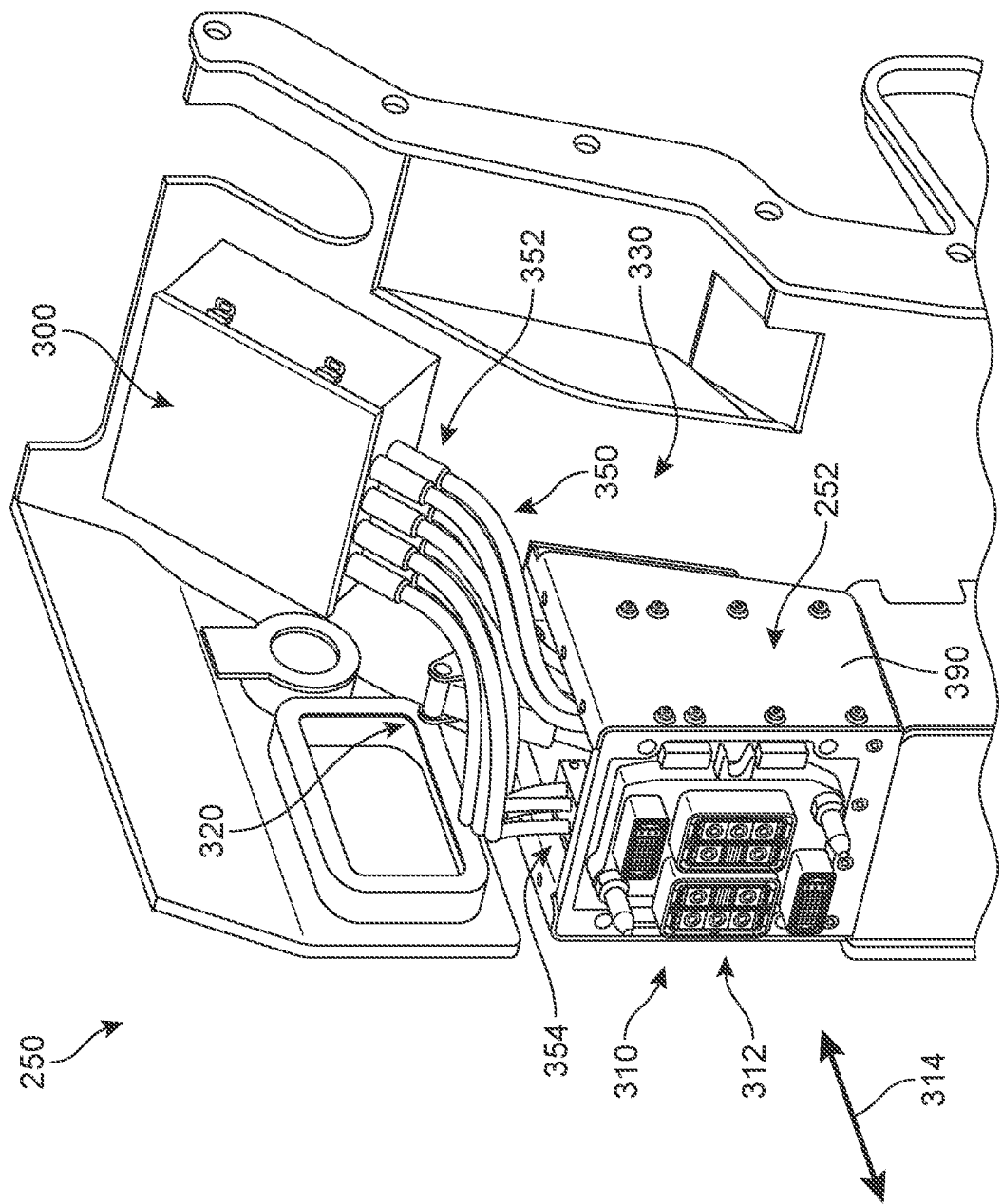
FIG. 3 shows a schematic view of various internal components of a portion of a mining vehicle, according to an embodiment.

In order to provide the reader with a greater understanding of the proposed embodiments, additional details regarding the peripheral corner portion 250 are discussed with reference to FIG. 3. In FIG. 3, a cutaway interior view of the peripheral corner portion 250 is shown. The active component 252 can be more clearly observed, including a male coupling interface portion ("male interface") 310 that faces outward. The active component 252 is disposed against an inner forward-facing wall 330 of the vehicle. In addition, an electrical box 300 is disposed adjacent to the active component 252, in this case above the active component 252. A plurality of electrical cables ("cables") 350 are joined to a first set of internal connectors 352 attached to the electrical box 300 and extend into an opening formed in a top portion of a housing frame ("housing") 390 of the active component 252. In one embodiment, half of the cables 350 are attached to a second set of internal connectors via a first cabling panel portion 354 disposed inside of the active component 252, and the remaining half of cables 350 are attached to a third set of internal connectors via a second cabling panel portion (obstructed from view by an outer sidewall of housing 390) on the opposite side of a linear actuator 320. Each of the cabling panel portions are in electrical communication with a first set of external connectors ("first connector set" or "first connector array") 312 disposed on the male interface 310 (see FIG. 6). In other embodiments, the cabling may be routed differently than shown here, and/or the internal connectors may be located in other regions of the system.

The linear actuator 320 can be seen protruding partially out of the top portion of the housing 390 of active component 252. As will be discussed below, the linear actuator 320 is configured to move the male interface 310 back and forth along a longitudinal axis 314 (see FIGS. 9A and 9B). As can be appreciated from the view of FIG. 3, once the passive component of a battery assembly is connected to the active component 252, electricity can flow through the cables 350 and provide power to the vehicle. This occurs without manual interaction with cables 350, greatly increasing efficiency, reducing vehicle downtime, and allowing for a streamlined and effective battery connection (and disconnection) process.

Figure 4:
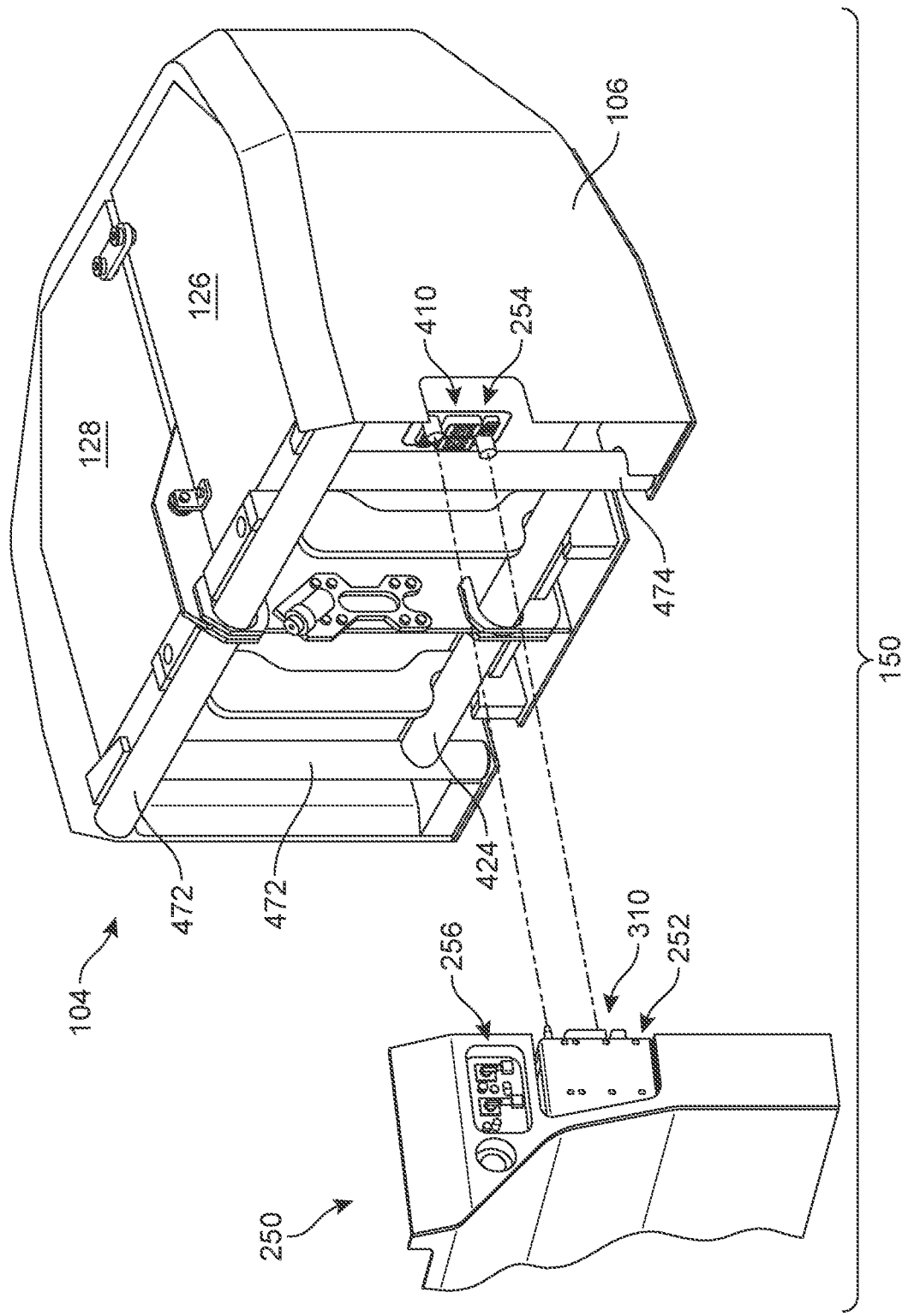
FIG. 4 is a schematic isometric view of an embodiment of a battery assembly and a portion of a mining vehicle prior to docking.

An overview of an embodiment of the connection mechanism is depicted now with reference to FIG. 4. In FIG. 4, the battery assembly 104 and the peripheral corner portion 250 of the vehicle can be seen in a disconnected configuration. The schematic view more clearly depicts various structural features of battery assembly 104. However, it may be appreciated that in different embodiments, some of the following features of a battery assembly could be optional. In this example, battery assembly 104 includes an outermost battery cage 106, first battery pack 126, and second battery pack 128. Each battery pack may further one or more battery cells.

In general, battery cage 106 may serve to retain and protect each battery pack. To this end, battery cage 106 may be sized and dimensioned to receive each of first battery pack 126 and second battery pack 128. In some embodiments, battery cage 106 is configured as a relatively thin outer casing with an interior cavity that can hold two battery packs in a side-by-side configuration. In particular, battery cage 106 may have a horizontal footprint that is slightly larger than the horizontal footprint of the two battery packs together. Battery cage 106 also has a vertical height that is slightly larger than the height of a single battery pack. Battery cage 106 may include provisions to facilitate mounting and dismounting. Some embodiments can include one or more horizontal bars that are configured to facilitate mounting. Some embodiments can include one or more vertical bars that are configured to facilitate mounting. Some embodiments can include a combination of horizontal and vertical bars to facilitate mounting. As seen in FIG. 4, battery cage 106 includes a set of horizontal mounting bars, including an upper horizontal mounting bar 422 and a lower horizontal mounting bar 424, as well as a set of vertical mounting bars including a first vertical mounting bar 472 and second vertical mounting bar 474.

It may be appreciated that both horizontal bars and vertical bars can facilitate mounting in at least three ways. First, either type of bar can be grasped by components of a mounting and dismounting system to help raise and/or lower the battery assembly. Second, either type of bar can facilitate horizontal and/or vertical alignment by interacting with a corresponding component on a mounting and dismounting system (e.g., a v-shaped block that may help to automatically align the battery cage in the horizontal and/or vertical directions). Third, either type of bar can be locked in place, for example using one or more latches or other locking mechanisms. It may be appreciated though that in different embodiments horizontal and vertical bars could be used to achieve different functions (e.g., horizontal bars for lifting, alignment and latching and vertical bars for alignment and latching but not lifting).

In some embodiments, battery cage 106 may primarily be closed on the bottom and side surfaces. However, battery cage 106 may be partially open on rearward side that faces the vehicle so that connecting ports or other provisions of the battery packs can be exposed. Furthermore, battery assembly 104 includes passive component 254 that is exposed through a gap in battery cage 106, as shown in FIG. 4. The passive component 254 is configured to enable power to flow from both the first battery pack 126 and the second battery pack 128 to the vehicle (when the battery assembly is connected to the vehicle). In other words, the battery assembly 104 allows for the vehicle to be connected to and powered by multiple battery packs via a single port or interface.

In FIG. 4, two dotted lines indicate the connection path between the male interface 310 of the active component 252 and a female coupling interface portion ("female interface") 410 of the passive component 254, where the term interface corresponds to the external, outwardly facing region and associated connectors formed on each component. When the two components are brought together during the mounting and docking process, embodiments of the proposed systems enable the active component 252 to 'pop out' or travel outward in order to complete the electrical connection with the passive component 254. Similarly, prior to the dismounting process, the active component 252 will be automatically retracted and separated from the passive component 254, allowing for a simplified, reliable, and swift disconnection between the vehicle and the battery assembly 104.

As noted above, it is desirable to have a system that can efficiently swap out discharged batteries with fully charged batteries so that vehicles are not idle for long periods as they wait for recharging. In different embodiments, the vehicle is configured with all the provisions necessary to dismount discharged batteries and mount fully charged batteries on the ground of a mine, for example as discussed in U.S. Patent Publication Number 2019/0263269 filed on Feb. 28, 2018, titled "Mounting and dismounting system for a battery assembly," the entire contents of which are hereby incorporated by reference. As a general matter, when the vehicle has depleted the power from its current battery packs assembly such that the battery assembly has a low charge, the vehicle can be moved towards an area where a fully charged battery assembly (i.e., an assembly with fully charged battery packs) is disposed. Before mounting a new battery assembly, however, the vehicle may travel to a location that is adjacent to the charged battery assembly in order to dismount (physically remove or "drop off") the discharged battery assembly.

Prior to dismounting the battery, one or more physical connections between primary battery assembly and the vehicle must be disconnected. Such connections can comprise of electrical circuits that direct power between one or more batteries and one or more motors. As noted above, conventional methods required that a vehicle operator exit the cab and walk over to the end of the vehicle in order to manually disconnect the electrical cables. In some cases, each battery pack is connected by at least one cable to one or more electrical circuits. Thus, electrically disconnecting each battery pack requires manual disconnection of one or more cables. In contrast, the proposed embodiments describe an automated connection system. In other words, rather than requiring an operator to handle the electrical cables for the battery packs of the battery assembly, the battery assembly can be fully disconnected with no manual interaction. This may help save time during the swapping process by reducing the number of times an operator has to get in and out of the cab throughout the process.

Once the depleted battery assembly has been dismounted, the vehicle can move away from the depleted battery assembly and head to the location of a fully charged battery assembly. The operator will move the vehicle into relative position in order to accurately align components of the two components. An example of this position is presented in FIG. 2. Once the charged battery assembly 104 is raised off the ground, the connection system 150 shown in FIG. 4 will be triggered to reconnect the electrical cables and/or other physical connections with the battery packs of battery assembly 104. Further details regarding the two primary components of the connection system 150 will now be provided with reference to FIGS. 5-11.

Figure 5:
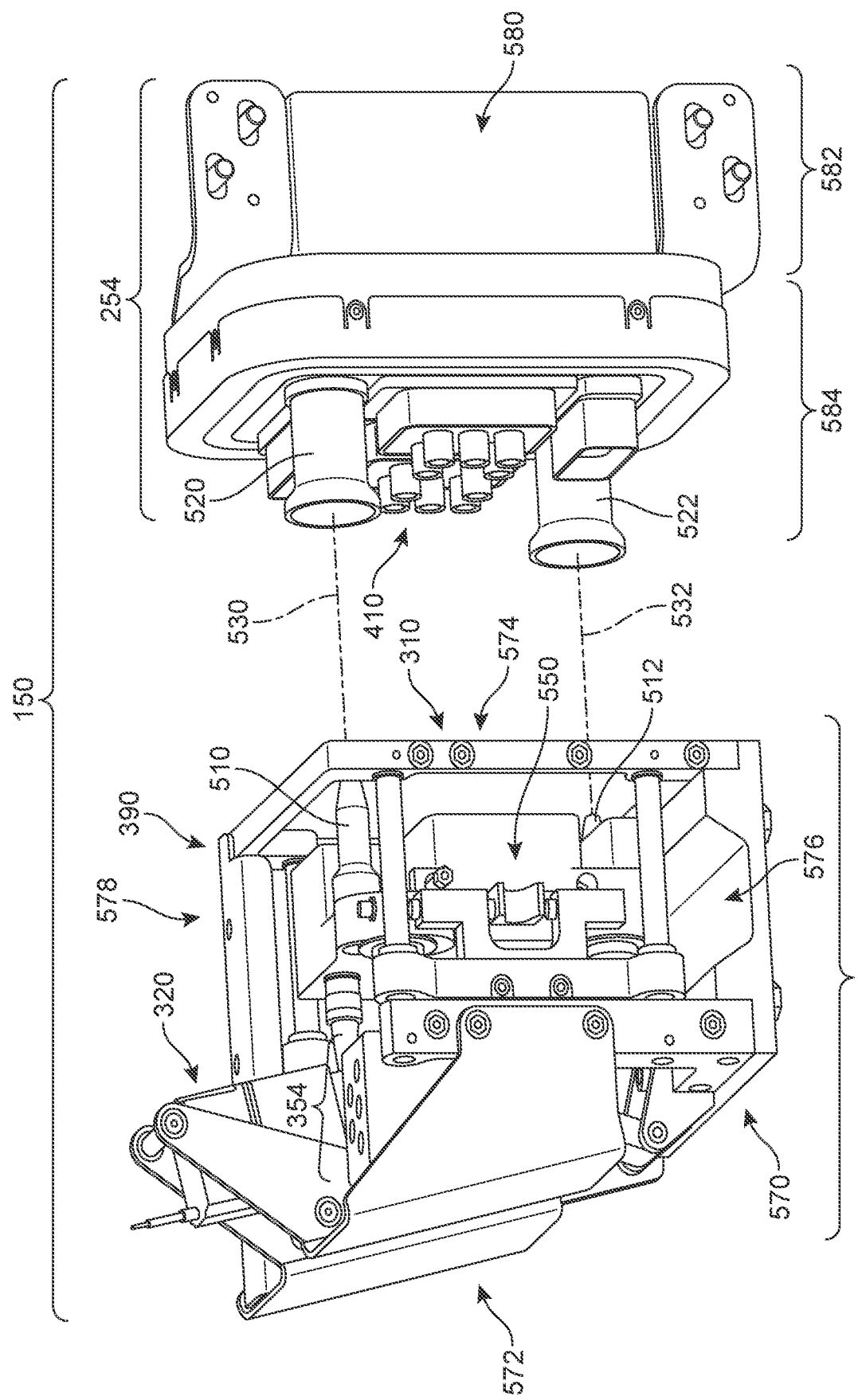
FIG. 5 is a schematic isometric view of an embodiment of an active component and a passive component aligned and facing one another in the un-docked state.

An overview of an embodiment of the connection system 150 is provided in FIG. 5, which offers an isometric, isolated view of both the active component 252 that is connected to or integrated into the vehicle, and the passive component 254 that is connected to or integrated into the battery assembly. Some portions of the outermost or exterior housing of active component 252 and portions of the battery cage associated with passive component 254 have been removed to permit the reader a clearer view of some of the structural aspects of the system.

As will be discussed in greater detail below, in different embodiments, the connection system 150 includes provisions for mating or securing each component together and ensuring a proper alignment and fit for enabling the flow of power between the batteries and the vehicle. This will be presented more directly in FIGS. 6 and 7 below. However, for purposes of introduction, portions of these structures can be seen in FIG. 5. For example, as noted earlier, active component 252 includes male interface 310 and the passive component 254 includes female interface 410. Each interface faces the other interface in an orientation configured to facilitate the contact and link between the electrical connections (see FIGS. 6 and 7) of the two interfaces.

The male interface 310 is an exterior facing surface of a larger carriage body or "body portion" 550 of the active component 252 that includes and directs the wiring and cables that will convey power from the battery assembly to the vehicle, for example traveling via the first cabling panel portion 354 (see FIG. 3) and second cabling panel portion (not visible here). The body portion 550 and actuator 320 are retained within housing 390. Furthermore, the female interface 410 is an exterior facing surface of a larger base portion 580 of the passive component 254. The female interface 410 includes elements that direct the wiring and cables configured to convey power from the battery packs to the active component 252, for example from the first battery pack and the second battery pack (not visible here).

In addition, the connection system 150 includes structural features configured to join and secure (i.e., mate) the two components during the auto-connection process, which will also be referred to herein as docking. In FIG. 5, a set of mating mechanisms ("mating set") extend from each of the male interface 310 and female interface 410. The male interface 310 includes two protruding portions or members, comprising a first protruding portion 510 and a second protruding portion 512. In addition, the female interface 410 includes two receptacle portions, comprising a first receptacle 520 and a second receptacle 522.

In the embodiment of FIG. 5, the pair of protruding portions are substantially similar in shape and dimensions to one another, and the pair of receptacle portions are substantially similar in shape and dimensions to one another. In this case, each protruding portion has a generally elongated shape (see FIG. 8C). However, in other embodiments, the pair of protruding portions may differ from one another and/or the pair of receptacle portions may differ from one another. The shape and dimensions of each structure can instead be understood to be configured to match its corresponding mate. In other words, each receptacle portion is configured to snugly receive and connect with a corresponding protruding portion (providing a first mated set), and each protruding portion is configured for snug insertion into a corresponding receptacle portion (providing a second mated set). Each mated set is oriented to be substantially aligned along a horizontal axis. This is represented by a first central axis 530 extending between the first protruding portion 510 and its corresponding mate, the first receptacle 520, and a second central axis 532 extending between the second protruding portion 512 and its corresponding mate, the second receptacle 522. In one embodiment, a horizontal midline of each of the receptacles and protruding portions is aligned with the central axes.

For purposes of reference, the housing 390 can be understood to include an exterior 370 comprising a rear side 572 (disposed closest to the vehicle), a front side 574 (disposed closest to the battery assembly when the two are docked together), a distal side 576 (disposed on the same side as the cab of the vehicle, and associated with an outer sidewall that is removed here), and an open top side 578 from which the cabling and the actuator 320 extend out and to the vehicle. The opposing, proximal side of the housing 390 of the active component 252 is facing an interior region of the vehicle itself and would not normally be visible. Similarly, for purposes of reference, the passive component 254 can be understood to include a rear portion 582 (providing an interior portion, disposed within the battery assembly cage), and a forward portion 584 (disposed closest to the active component when the two are docked together, and exterior to the battery assembly cage, as shown in FIG. 4). Only the forward portion 584 is exposed or visible when the component is installed in the battery assembly cage.

Figure 6:
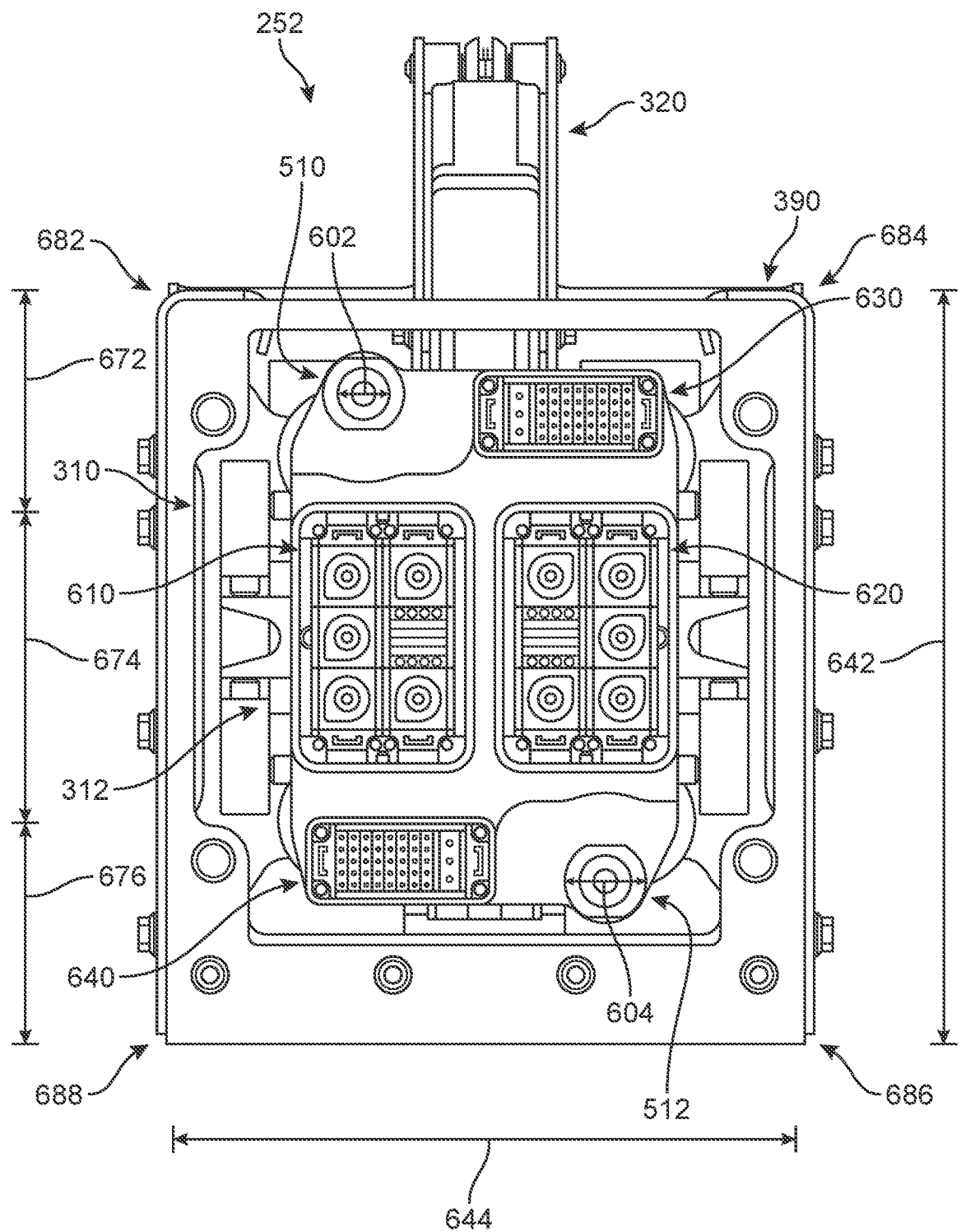
FIG. 6 is a schematic head-on view of an embodiment of an active component of a mining vehicle.
Figure 7:
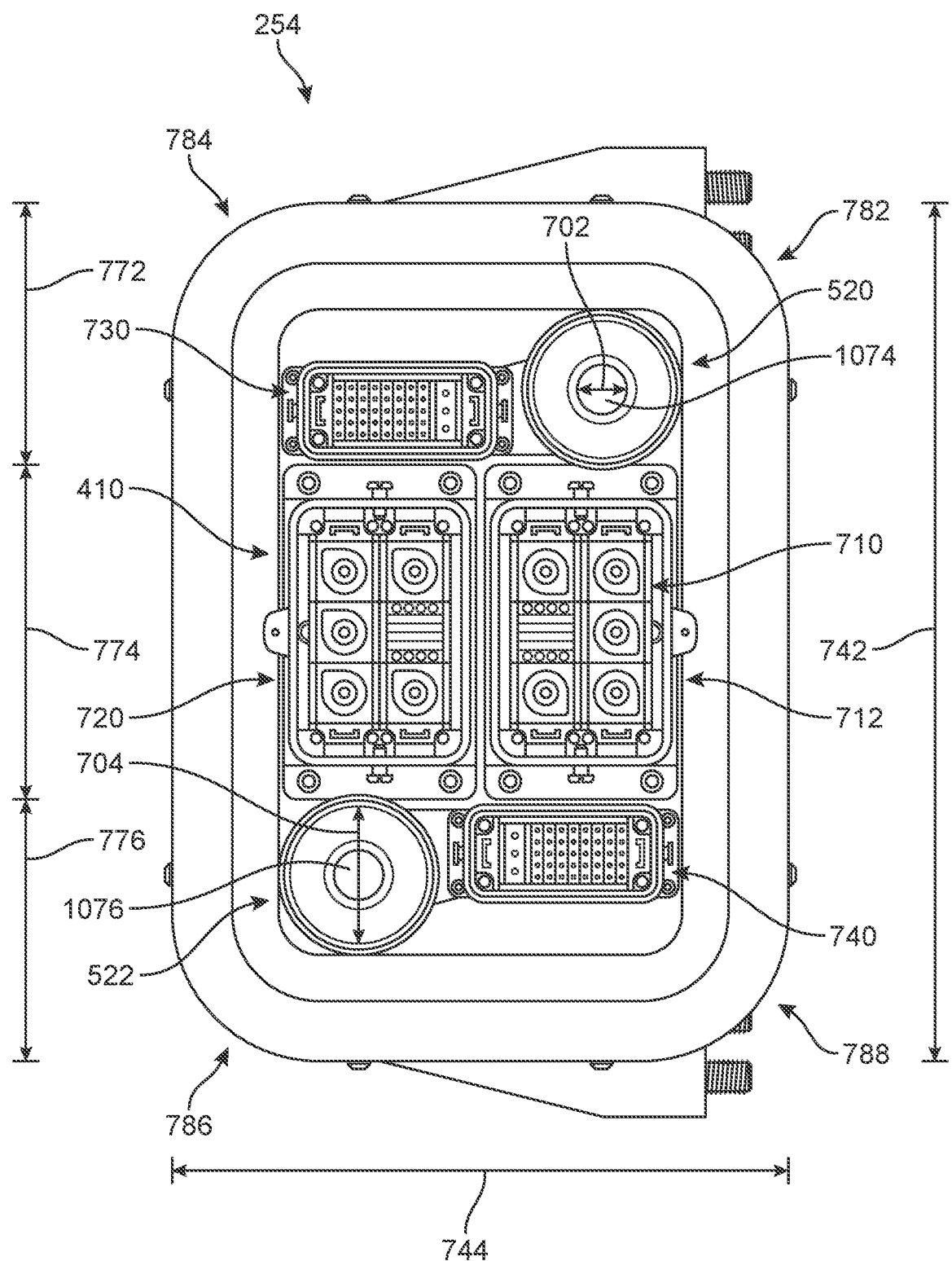
FIG. 7 is a schematic head-on view of an embodiment of a passive component of a battery assembly.

Additional details regarding each of the interfaces will now be presented with respect to FIGS. 6 and 7. In FIG. 6, a frontal view of an embodiment of the active component 252 is shown. In this view, the arrangement of the first set of external connectors ("first connector set" or "first connector array") 312 disposed on the male interface 310, introduced earlier in FIG. 3, can be more clearly seen. In this embodiment, the first connector set 312 includes a first connector panel 610, a second connector panel 620, a third connector panel 630, and a fourth connector panel 640, where each connector panel includes a plurality of socket connectors that are each configured to receive and interface with a corresponding plug connector of the passive component (see FIG. 7). In other embodiments, each component may include a mix of plug connector types and socket connector types, or the active component may include plug connector types and the passive component may include socket connector types.

In some embodiments, male interface 310 comprises a substantially rectangular shape. For example, the outer perimeter of male interface 310 has a first length 642 that is greater than its first width 644, and includes a first corner portion 582, a second corner portion 584, a third corner portion 586, and a fourth corner portion 588. In FIG. 6, the features of male interface 310 are positioned such that the first protruding portion 510 is nearest to the first corner portion 682 and the second protruding portion 512 is nearest to the third corner portion 686 that is disposed at an opposite end relative to the first corner portion 682. This arrangement can increase the stability of the system by distributing the locking mechanisms substantially uniformly across the male interface and ensuring the components are held together evenly. Similarly, third connector panel 630 is nearest to the second corner portion 684 and the fourth connector panel 640 is nearest to the fourth corner portion 688 that is disposed at an opposite end relative to the second corner portion 684. In other embodiments, the arrangement of the various features can vary.

Furthermore, for purposes of reference, the male interface 310 can be understood to comprise three regions, including an upper region 672, an intermediate region 674, and a lower region 676, where the intermediate region 674 is disposed between the upper region 672 and lower region 676. In the embodiment of FIG. 6, the first protruding portion 510 and third connector panel 630 are disposed adjacent to one another in the upper region 672, the first connector panel 610 and second connector panel 620 are disposed adjacent to one another in the intermediate region 674, and the second protruding portion 512 and fourth connector panel 640 are disposed adjacent to one another in the lower region 676. The overall arrangement of the features in this case is such that, were the male interface 310 to be rotated 180 degrees, the position of each protruding portion and connector panel would be in substantially the same arrangement.

In some embodiments, the first connector panel 610 and second connector panel 620 are disposed adjacent to one another in a symmetrical (i.e., mirror-image) arrangement relative to a vertical midline, and include substantially similar connector elements. For example, first connector panel 610 includes five socket elements (represented by circular areas) arranged in a C-shape and second connector panel 620 includes five socket elements (represented by circular areas) arranged in a reverse C-shape. The first connector panel 610 can be configured to receive power from a first battery pack of the battery assembly, and the second connector panel 620 can be configured to receive power from a second battery pack of the battery assembly. In some embodiments, the first connector panel 610 and second connector panel 620 are configured as high voltage connectors, and third connector panel 630 and fourth connector panel 640 are configured as low voltage connectors.

Referring now to FIG. 7, a frontal view of an embodiment of the passive component 254 is shown. In this view, the arrangement of a second set of external connectors ("second connector set") 712 disposed on the female interface 410 can be seen. As will be described herein, the second connector set 712 is configured to align with and connect to the first connector set 312 of FIG. 6. In this embodiment, the second connector set 712 includes a first connector grid 710, a second connector grid 720, a third connector grid 730, and a fourth connector grid 740, where each connector grid includes a plurality of plug connectors (e.g., pins) that are each configured to insert into and interface with a corresponding socket connector of the active component (see FIG. 6).

In some embodiments, female interface 410 comprises a substantially rectangular shape. For example, the outer perimeter of female interface 410 has a second length 742 that is greater than its second width 744 and includes a first corner portion 582, a second corner portion 584, a third corner portion 586, and a fourth corner portion 588. In FIG. 7, the features of female interface 410 are positioned such that the first receptacle 520 is nearest to the first corner portion 782 and the second receptacle 522 is nearest to the third corner portion 786 that is disposed at an opposite end relative to the first corner portion 782. Similarly, third connector grid 730 is nearest to the second corner portion 784 and the fourth connector grid 740 is nearest to the fourth corner portion 788 that is disposed at an opposite end relative to the second corner portion 784. In other embodiments, the layout of the various structural features can vary. In each case, it can be appreciated that the layout of each structure is configured to align with the layout presented of the corresponding mating structures of active component shown in FIG. 6.

Furthermore, for purposes of reference, the female interface 410 can be understood to comprise three regions, including an upper region 772, an intermediate region 774, and a lower region 776, where the intermediate region 774 is disposed between the upper region 772 and lower region 776. In the embodiment of FIG. 7, the first receptacle 520 and third connector grid 730 are disposed adjacent to one another in the upper region 672, the first connector grid 710 and second connector grid 720 are disposed adjacent to one another in the intermediate region 674, and the second receptacle 522 and fourth connector grid 740 are disposed adjacent to one another in the lower region 776. The overall arrangement of the features in this case is such that, were the female interface 410 to be rotated 180 degrees, the position of each receptacle and connector grid would be in substantially the same arrangement.

In some embodiments, the first connector grid 710 and second connector grid 720 are disposed adjacent to one another in a symmetrical (i.e., mirror-image) arrangement relative to a vertical midline, and include substantially similar connector elements. For example, first connector grid 710 includes five pin elements (represented by round or teardrop-shape areas) arranged in a C-shape and second connector grid 720 includes five pin elements (represented by round or teardrop-shape areas) arranged in a reverse C-shape. The first connector grid 710 can be configured to transfer power from a first battery pack of the battery assembly, and the second connector grid 720 can be configured to receive power from a second battery pack of the battery assembly. In some embodiments, the first connector grid 710 and second connector grid 720 are configured as high voltage connectors, and third connector grid 730 and fourth connector grid 740 are configured as low voltage connectors, again forming a correspondence to the similar arrangement depicted in FIG. 6.

Furthermore, as noted earlier, in different embodiments the connection system 150 includes provisions for enabling an automated, secure connection between the active component 252 and the passive component 254. Referring now to both FIGS. 6 and 7, the mated sets across the two components can be better described. In the embodiment of FIG. 6, it can be understood that the two protruding portions have a substantially similar geometry and size, comprising generally of an elongated cylindrical structure with a thick base region at a first (proximal) end and a tapered region at a second outer (distal) end. Throughout this application, proximal refers to a component or element that is disposed closer to a central mass or center of the larger structure, and distal refers to a component or element that is disposed further from a central mass or center of the larger structure. For purposes of illustration, in FIG. 6, first protruding portion 510 is labeled with a first inner diameter 602 (corresponding to the narrower tapered end), and second protruding portion is labeled with a first outer diameter 604 (corresponding to the wider base) that is greater than first inner diameter 602.

Similarly, in the embodiment of FIG. 7, it can be understood that the two receptacles have substantially a similar geometry and size, comprising generally of a conical outer rim portion and an elongated cylindrical channel or tube. In FIG. 7, first receptacle 520 is labeled with a second inner diameter 702 (corresponding to the narrower channel), and second receptacle is labeled with a second outer diameter 704 (corresponding to the wider receptacle opening) that is greater than second inner diameter 702. Each receptacle is hollow, extending from the opening at a first outer (distal) end and terminating as a blind hole at a second (proximal) end. As will be shown in FIGS. 8A-8C, the docking procedure that will secure the two components together is based at least in part on the alignment of the mated sets, as well as the snug "lock and key" type fit between each of the protruding portion and corresponding receptacle. Thus, the first inner diameter 602 of the tapered end of the protruding portion is configured to slide and fit snugly into a slightly larger second inner diameter 702 of the receptacle toward the end of the channel. Similarly, the second outer diameter 704 of the opening of the receptacle is configured to receive the slightly smaller first outer diameter 604 of the base of the protruding portion to achieve a stable, fixed position. It can further be appreciated that the sloped contact surfaces of the protruding portion and receptacle act to guide the protruding portion smoothly into a centrally aligned position with respect to the horizontal direction within the receptacle.

Figure 8A:
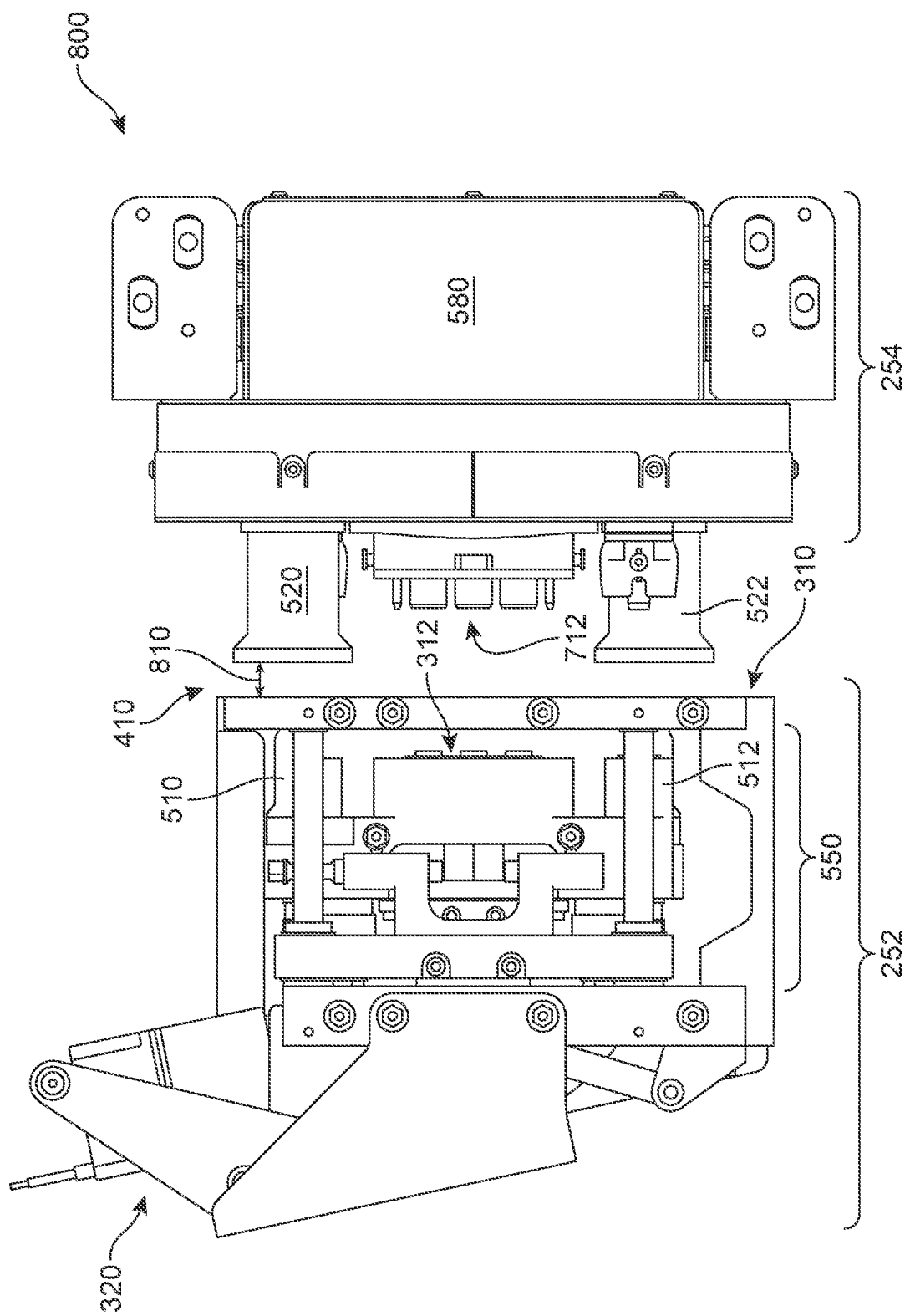
FIGS. 8A-8C depict an embodiment of a docking sequence between an active component and a passive component.
Figure 8B:
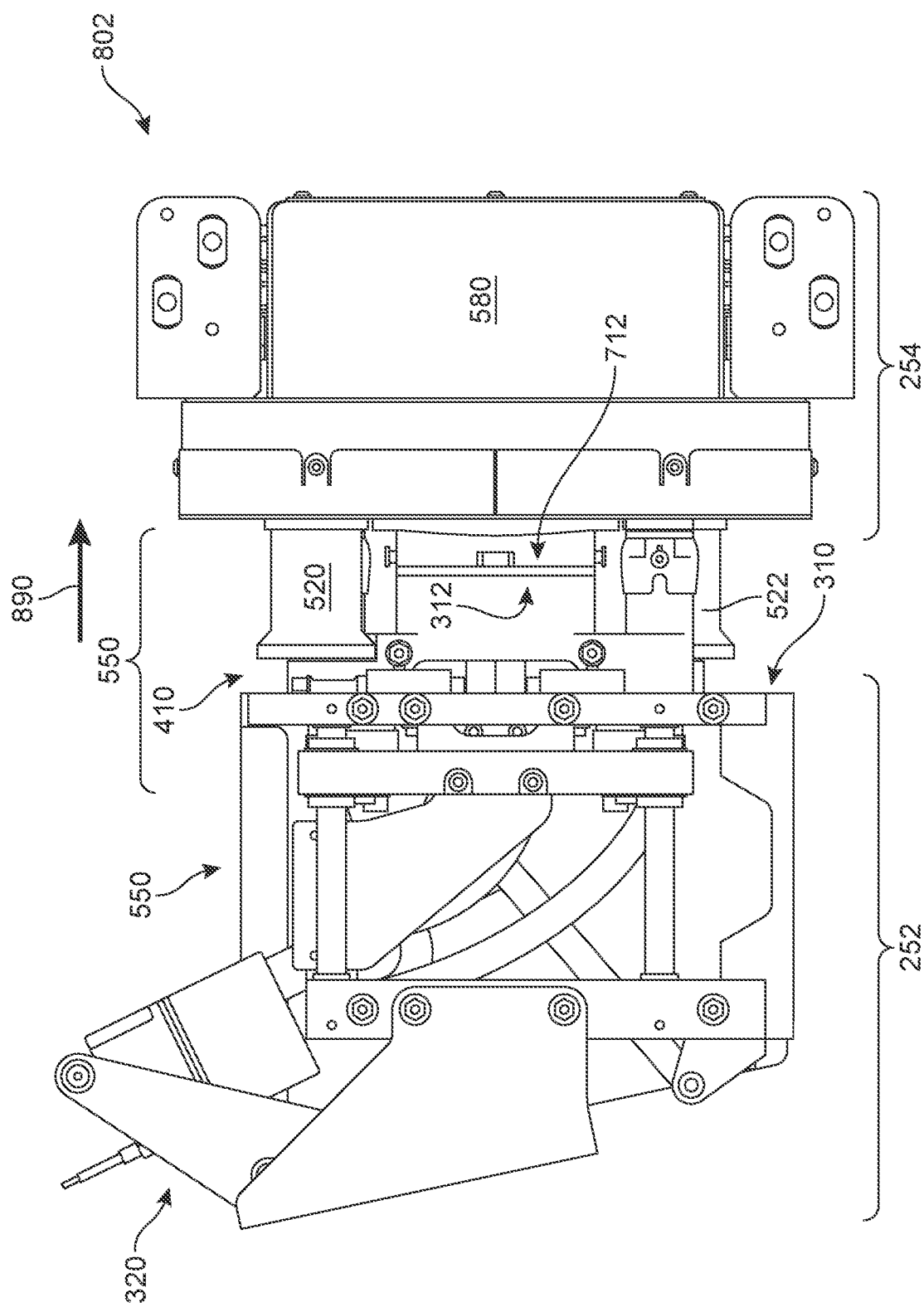

As noted earlier, embodiments of the connection system include provisions for automatically transitioning from a disengaged or un-docked configuration to an engaged or docked battery configuration, where the use of the term "docked" refers to a complete, locked, and functional connection between the vehicle's active component and the battery assembly's passive component, where the battery assembly is able to provide power to the vehicle via the established connection. "Un-docked" refers to the state in which the passive component and active component are no longer connected. An overview of the connection process ("docking") is illustrated in FIGS. 8A and 8B. FIG. 8A depicts the position of each component relative to one another in an un-docked or pre-docked configuration 800, and FIG. 8B depicts the position of each component relative to one another in a docked configuration 802.

In FIG. 8A, the active component 252 is disposed directly adjacent to the passive component 254, with the male interface 310 head-on facing the female interface 410. As discussed above, the first protruding portion 510 is directly aligned with the first receptacle 520, and the second protruding portion 512 is directly aligned with the second receptacle 522, along the horizontal plane. Similarly, the first connector set 312 is directly aligned with the second connector set 712 along the horizontal plane. Prior to docking, the two components are in a specific orientation and position relative to one another. In some embodiments, a distance 810 between the two components can be between half an inch to several inches. In the embodiment of FIG. 8A, the distance 810 may be understood to correspond to approximately one inch. Once the two components are arranged in this specific position, the automated docking process can be initiated. In some embodiments, docking can be automatically initiated when the two components are in a particular arrangement and distance from one another. In another embodiment, the docking can be manually initiated, with the docking process itself being automated following the initiation.

In some embodiments, initiation of the docking process corresponds to a command being transmitted to the actuator

320. Once the actuator 320 has been triggered, the body portion 550 of the active component 310 will be moved from a first position to a second position, depicted in FIG. 8B. In the first position (shown in FIG. 8A), a majority of the body portion 550 is enclosed, encased, and/or disposed within the outermost housing frame 390 of the active component 310. In the second position (shown in FIG. 8B), a majority of the body portion 550 is external relative to or disposed outside of the housing frame 390 of the active component 310. The motion of the body portion 550 is substantially linear in a direction aligned with a horizontal axis 890.

In different embodiments, the distance traversed by the body portion 550 is at least the distance 810 of FIG. 8A. In general, the distance traversed will be greater than distance 810, in order to ensure full contact between the two connector sets and the two mating sets. For example, in one embodiment, the body portion 550 can travel approximately 1-10 inches. In the embodiment of FIG. 8B, the body portion 550 has traveled approximately five inches, enabling the active component 252 to become docked with passive component 254. In other words, the two components are now locked together. The mating sets anchor and hold the two components together in a stable, steady configuration, and ensure the connectors are aligned correctly to enable a full connection between the two interfaces. Additional information regarding the alignment of the two sets of connectors will be discussed with respect to FIGS. 10A-11. It can be understood that the battery assembly will remain securely connected to the electric vehicle until a request to perform an un-docking operation is received by the system, in which case the linear actuator will transition from the extended state to the retracted state, causing disconnection and un-docking to occur, and returning the components to their initial configuration immediately prior to docking.

Figure 8C:
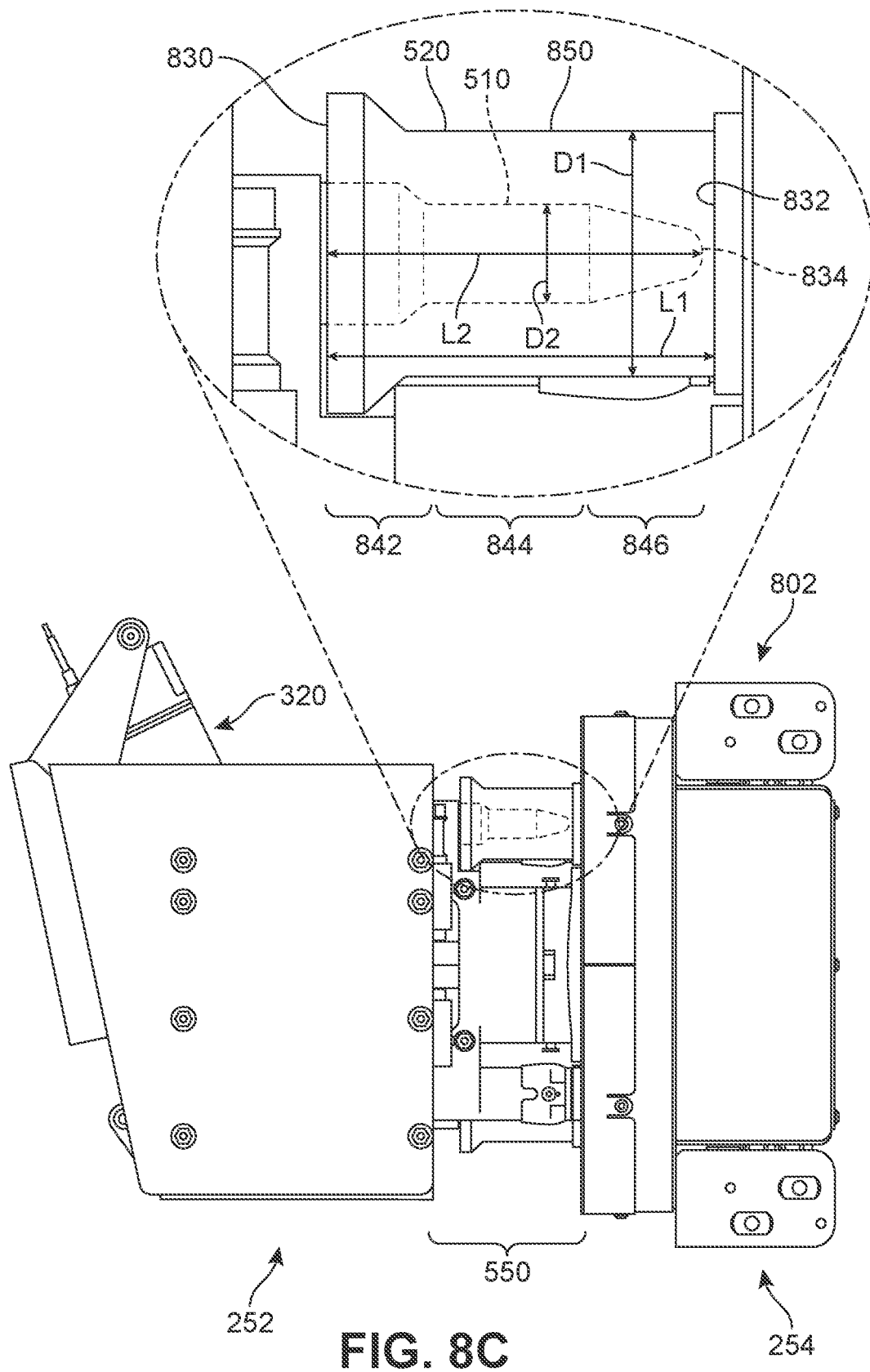

For purposes of clarity, a modified view of the docked configuration 802 is presented in FIG. 8C. In FIG. 8C, an approximate positioning of the first protruding portion 510 relative to the first receptacle 520 can be more clearly seen as the first receptacle 520 appears as transparent. In different embodiments, the geometry of first protruding portion 510 includes a base region 842, an elongated cylindrical region 844, a tapered region 846, and an apex 834. In addition, in different embodiments, the geometry of the first receptacle 520 includes a conical receiving end 830, an elongated channel 850, and a terminus 832. When the base portion 550 moves into the docked position, the protruding portion enters an opening formed by an outermost portion of the conical receiving end 830 and continues forward until apex 834 closely approaches or contacts the terminus 832. The full length of the cylindrical region 844 and tapered region 846 are disposed within the channel 850. In addition, at least a portion of the base region 842 may also be disposed within either or both of the conical receiving end 830 and channel 850. In some embodiments, a first length L1 of the first protruding portion 510 can thus be substantially similar to a second length L2 of the first receptacle 520. In addition, in some embodiments, a first diameter D1 of the cylindrical region 844 can be substantially similar to a second diameter D2 of the channel 850, thereby providing a snug, secure fit between the two elements and promoting a stable interface between the active component 252 and passive component 254.

In some embodiments, the apex 834 and/or terminus 832 can include a sensor that detects if/when contact has been made between the two elements, and/or how much force is being applied from the apex 834 onto the terminus 832. The sensor may also detect how much distance remains between the two surfaces and provide information to the system as to the status of the docking process. In one example, the system can provide linear telemetry indicating how far the body portion 550 has moved based on force feedback from the linear actuator 320. If the telemetry indicates that the carriage has moved a sufficient distance to complete the docking operation, a signal can be generated indicating that docking has been successfully achieved. In another example, the operator can be notified by generation of an automated error code if the telemetry is outside of the expected range. Similarly, during un-docking, linear telemetry from the linear actuator can be received that indicates the mating elements have been decoupled (e.g., each protruding portion has exited a corresponding receptacle). In such cases, the system can generate a signal for the operator indicating that the battery assembly has successfully disengaged from the electric vehicle.

In different embodiments, the connection system includes provisions for enabling the body portion 550 to travel from the first position to the second position as discussed in FIGS. 8A and 8B. As noted earlier, the active component 252 includes actuator 320. Referring now to FIGS. 9A and 9B, additional details regarding the operation of the actuator 320 will be provided. In some embodiments, the actuator 320 includes at least one linear actuator 940 and a linkage assembly 910, where the linkage assembly 910 comprises a first link 914 and a second link 916. The actuator 320 will be actuated by the linear actuator 940, and the linear actuator 940 includes a piston rod 912 that is configured to move the linkage assembly 910. In some embodiments, the linear actuator includes an electric actuator (e.g., an electric cylinder), while in other embodiments, the linear actuator includes a hydraulic cylinder. The piston rod 912 extends from a cylinder barrel 942 of the linear actuator 940 and is movably connected (permitting relative rotation) to the linkage assembly 910 at a coupling joint 944, forming an upside-down "Y"-shape. In addition, the first link 914 has an end that is movably connected to a rear portion of the body portion 550, and the second link 916 has an end that is movably connected to a bottom portion of the housing frame 390. For purposes of this disclosure, movably connected refers to a connection between two elements and/or components that is configured to allow each element or component to move and/or change position relative to the other element or component. Some non-limiting examples of movable connections include hinges, slides, brackets, and other connectors that permit movement of two or more parts that are otherwise fixedly attached or joined to one another.

Before the docking process is initiated, the piston rod 912 and linkage assembly 910 are in a retracted position, where the length of the piston rod 912 is disposed substantially within the cylinder barrel 942, as shown in FIG. 9A. This configuration will be referred to as a retracted state of the actuator. The piston rod 912 and second link 916 are arranged at an obtuse, first angle A1 relative to one another, and the first link 914 and second link 916 are arranged in a V-shape at an acute, second angle A2 relative to one another. Once the docking process is initiated, the piston rod 912 is pushed outward in a diagonally downward direction, exerting pressure on the coupling joint 944 as the stroke is performed. The links are pushed downward until they are substantially straightened, transitioning to an upside-down "T"-shape. Angle A1 decreases to an angle A3 of nearly 90 degrees, and angle A2 expands to an angle A4 of nearly 180 degrees. At the same time, the body portion 550 glides forward along a plurality of support rails. In this example, there are four support rails, though only two are visible in FIGS. 9A and 9B, where the remaining two rails are disposed on the opposite side of the body portion 550. The body portion 550 includes a first guide 920 that travels along a first rail 922, and a second guide 924 that travels along a second rail 926. The rails ensure that the movement of the body portion 550 remains stable and linear in a first direction 948.

During the transition between the two configurations toward docking, almost all of the motion of the linkage assembly 910 is directed in the horizontal direction with minimal vertical motion. This helps ensure that the male interface 310 has sufficient horizontal momentum for contacting and being engaged by the female interface features of the passive component of the battery assembly. The linkage assembly 910 then becomes passively locked in the extended position, resisting disengagement and/or a return to the previous configuration and preventing the system from being back-driven until an un-docking operation is initiated. In other words, the body portion 550 will not revert back to the retracted position until the linear actuator 940 retracts the piston rod 912. This configuration will be referred to as the extended state of the actuator.

When the battery assembly is to be disconnected from the vehicle, the actuator will automatically retract piston rod 912 within cylinder barrel 942, causing the coupling joint 944 to be pulled up, and contracting the linkage assembly 910 back into the retracted position depicted in FIG. 9A. During the transition between the two configurations toward un-docking (disconnection), almost all of the motion of the linkage assembly 910 is such that body portion 550 is translated in a primarily rearward direction. This helps ensure body portion 550 has sufficient rearward momentum to be disengaged from the passive component. In addition, the proposed linear actuator arrangement provides amplification of mechanical force and a passive back-driving lockout while remaining compact enough to implement on an electric vehicle that must navigate in small, narrow spaces.

Figure 10A:
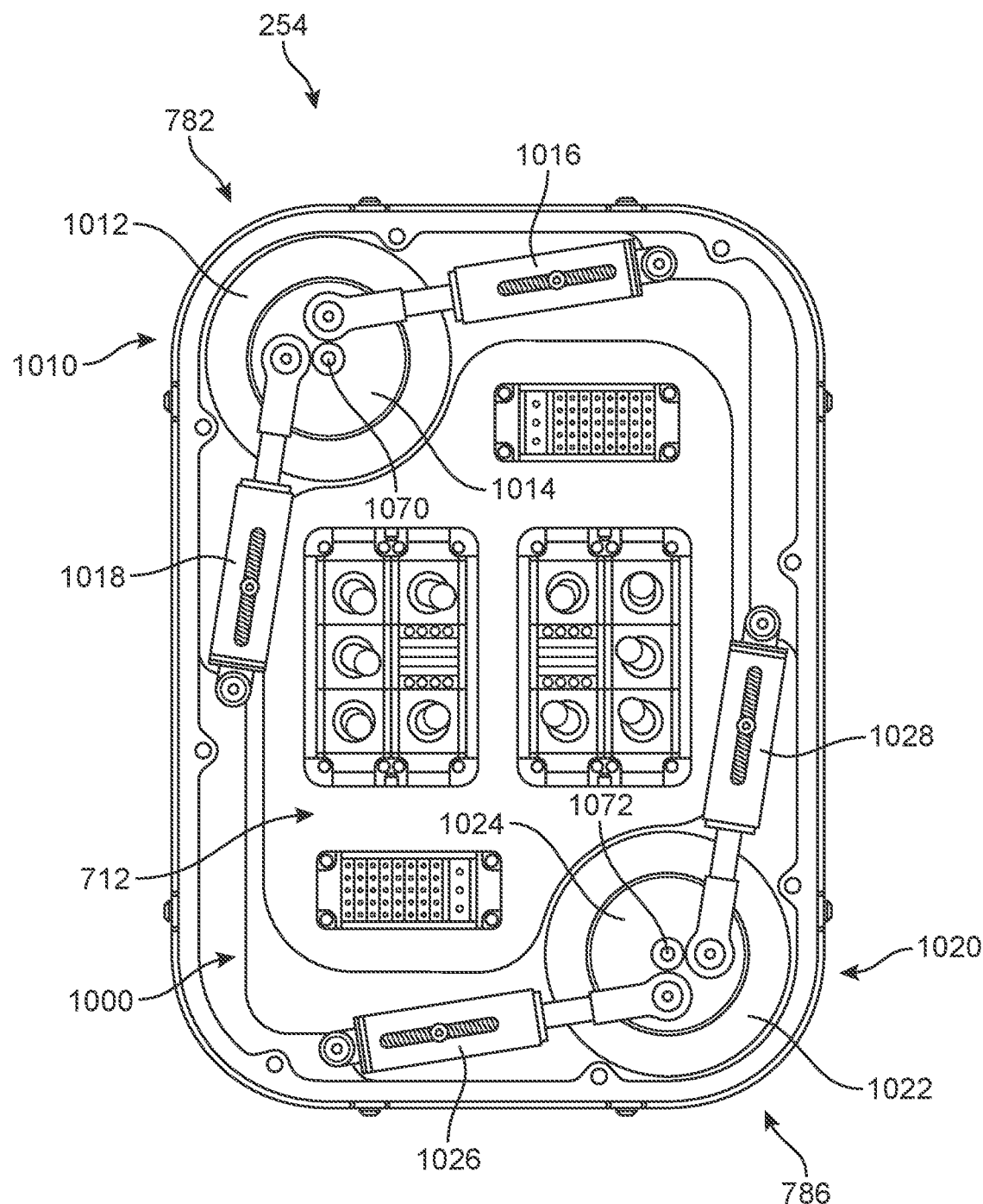
FIGS. 10A and 10B depict an embodiment of an alignment system for the passive component.
Figure 10B:
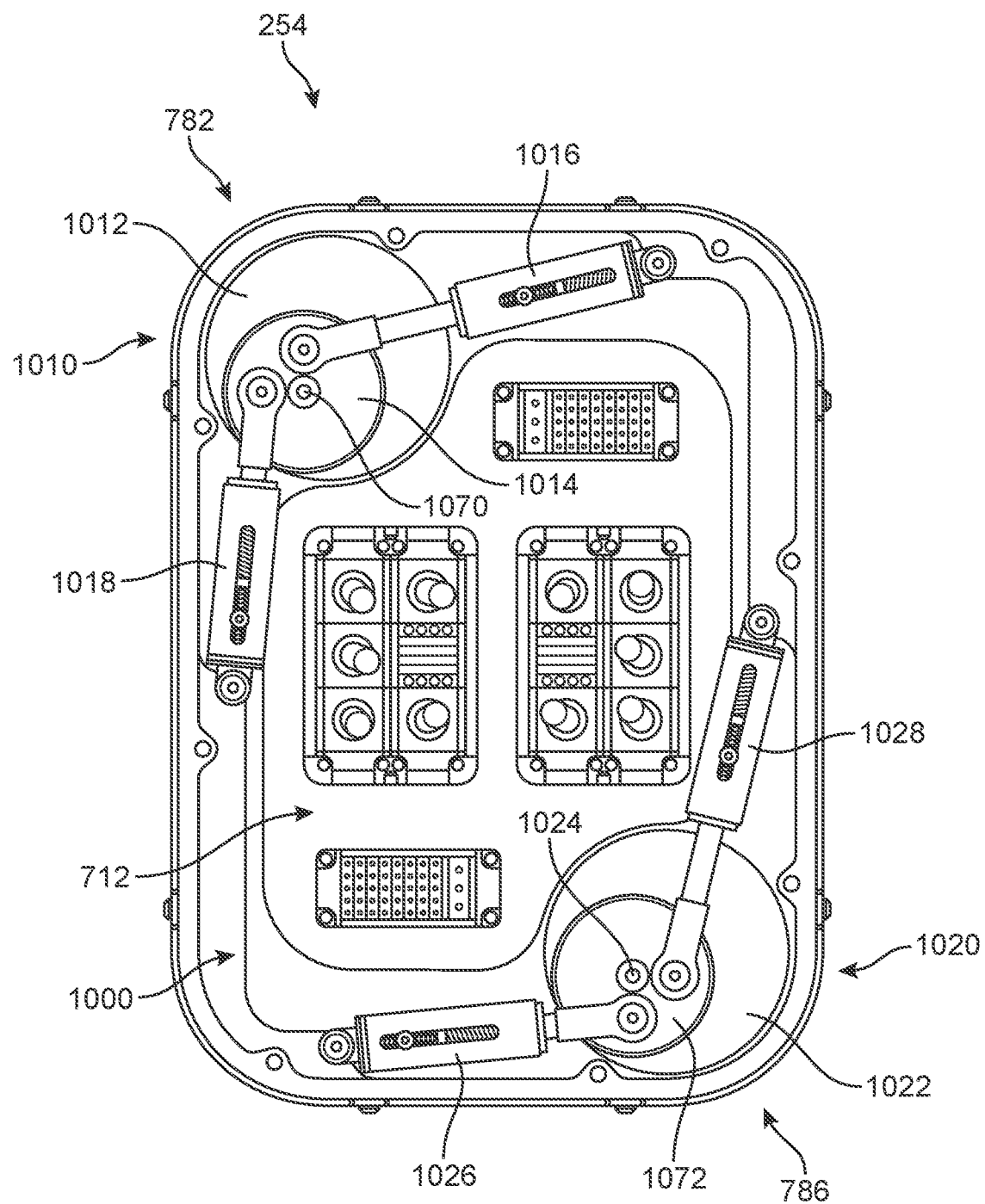
Figure 11:
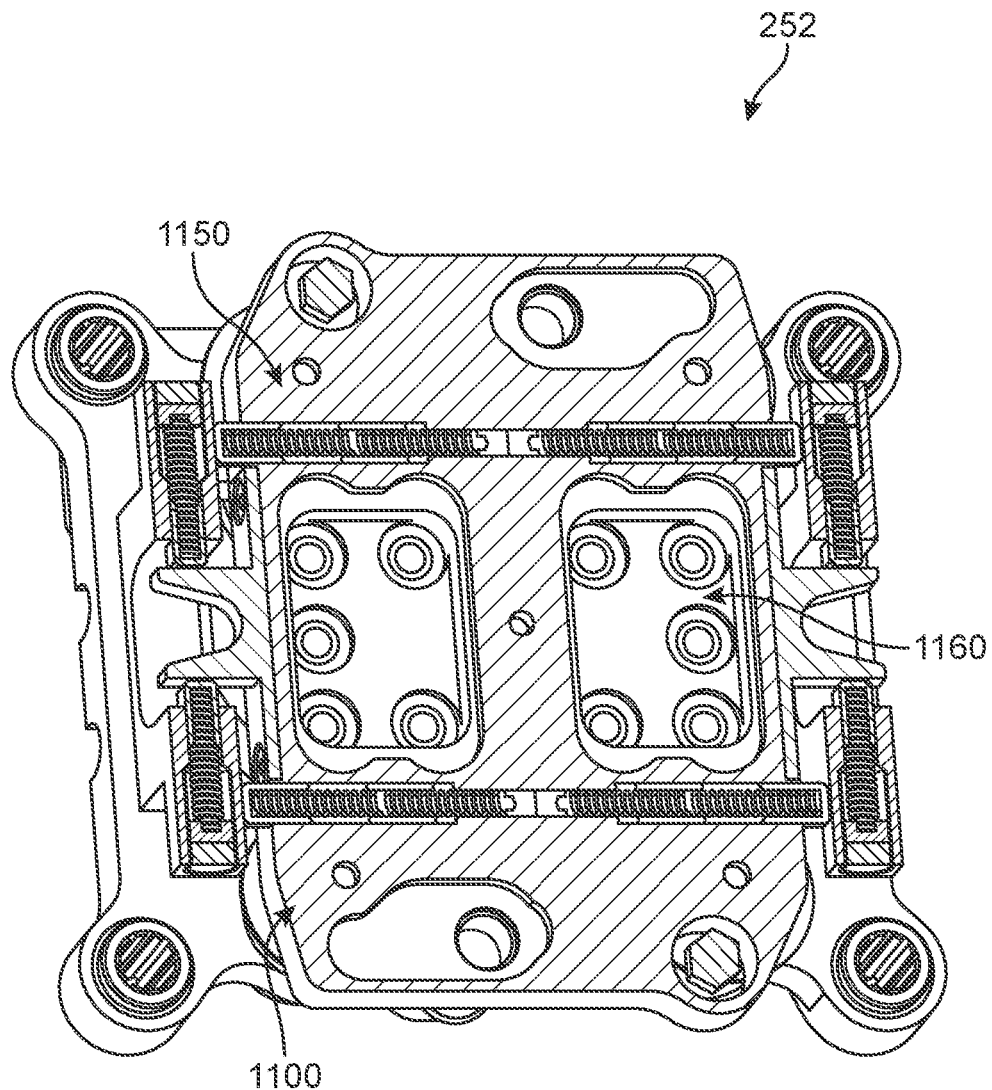
FIG. 11 depicts an embodiment of an alignment system for the active component.

As discussed earlier, the passive component and active component will be docked together in order to provide an electrical connection between the battery assembly and components of the vehicle. In order to ensure that the docking of the two components occurs smoothly and that the connection is maintained throughout the duration of the battery use by the vehicle without disruption, the centering mechanisms can compensate for the expected motion and movement of the parts relative to one another during docking and the subsequent normal operations of the vehicle. In different embodiments, the connection system can include automated provisions for ensuring the two components are centered and/or aligned in order to achieve a stable, functional connection. In some embodiments, such centering provisions can be implemented by an alignment system based on structures formed on either or both of the active component and passive component. FIGS. 10A and 10B present an embodiment in which the passive component 254 includes a first alignment system and FIG. 11 presents an embodiment in which the active component 252 includes a second alignment system.

Referring first to FIGS. 10A and 10B, an inwardly-facing side 1000 of the female interface 712 (i.e., the opposing-facing side relative to FIG. 7) is depicted in order to more clearly illustrate aspects of the first alignment system. The first alignment system can be seen to include a first centering mechanism 1010 disposed near the first corner portion 782 and a second centering mechanism 1020 disposed near the third corner portion 786. The first centering mechanism 1010 includes a first base disc 1012 and a smaller first offset disc 1014 that is disposed on top of the first base disc 1012 (i.e., overlapping or eclipsing a portion of the larger disc that is beneath), as well as a first spring-loaded cylinder 1016 and a second spring-loaded cylinder 1018. Similarly, the second centering mechanism 1020 includes a second base disc 1022 and a smaller second offset disc 1024 disposed on top of the second base disc 1022 (i.e., overlapping or eclipsing a portion of the larger disc that is beneath), as well as a third spring-loaded cylinder 1026 and a fourth spring-loaded cylinder 1028. Each spring-loaded cylinder is movably connected at one end to an offset disc, and at another end to a wall on which the second connector set 712 is mounted.

In addition, in FIG. 10A, each offset disc is centered with respect to the base disc such that the offset disc and base disc are concentric, where a first disc center 1070 is positioned at the center of both the first base disc 1012 and the first offset disc 1014, and a second disc center 1072 is positioned at the center of both the second base disc 1022 and the second offset disc 1024. This arrangement represents the default state for the centering mechanisms 1010 and 1020, which are configured to provide the receptacles with an alignment tolerance that is biased toward the center position by the spring-loaded cylinders.

The relationship of the centering mechanisms with the receptacles can be better understood with reference to both FIGS. 10A and FIG. 7. For example, the first disc center 1070 can be understood to correspond and be connected to a first center region 1074 of the first receptacle 520 located on the opposite side, and the second disc center 1072 can be understood to correspond and be connected to a second center region 1076 of the second receptacle 522 located on the opposite side (see FIG. 7). In other words, any movement of the receptacle will be in sync with movement of the offset disc.

Thus, the centering mechanisms allow the receptacles to move within the boundary set by the outer circumference of the base disc. The receptacles can be allowed to 'jiggle', wobble, vibrate or otherwise be jostled or experience other normal micro-motions that can be expected to occur during vehicle operation and/or docking, and are able to withstand the associated mechanical strains that might be applied on the system. For example, the centering mechanisms can ensure that alignment between the first receptacle and the first protruding portion is maintained during destabilizing movements of the battery assembly and/or electric vehicle.

An example of such a process will now be shown with reference to FIG. 10B. In the specific example of FIG. 10B, the first offset disc 1014 has been pulled downward to a maximum tolerance, where a portion of the outer perimeter of the two discs are now in contact with one another. In other words, the first disc center 1070 (and corresponding first receptacle disposed on the opposite side) has become offset relative to the origin point of the first base disc 1012, and the second disc center 1072 (and corresponding second receptacle disposed on the opposite side) has become offset relative to the origin point of the second base disc 1022. This motion is stabilized and restricted by each spring-loaded cylinder, which also work in concert to cause the offset discs to revert to the default position once the micro-motions that affected the position of the receptacle have ceased. It can be appreciated that during automated docking, some degree of offset between the two components can occur; in such cases, the centering mechanisms described herein can guide the receptacles into a predetermined position to ensure the connectors on each interface are aligned and properly engaged.

In different embodiments, the active component can also or alternatively be configured with centering mechanisms. Referring now to FIG. 11, a cutaway view of a rearward-facing side 1100 of the male interface of the active component 252 (i.e., the opposing-facing side relative to FIG. 6) is depicted in order to more clearly illustrate aspects of the second alignment system. In this example, the second alignment system comprises a third centering mechanism 1150 that includes a plurality of spring-loaded cylinders ("springs") arranged to form a perimeter around the interior cabling junctions 1160 for the first connector panel 610 and second connector panel 620 (see FIG. 6). In this case, the springs of third centering mechanism 1150 extend around the center in a substantially rectangular arrangement. In particular when the base portion of the active component is jostled or experiences micro-movements, a stable, continuously maintained connection between the male interface and female interface is essential.

The arrangement of FIG. 11 represents the default state for the third centering mechanism 1150, which is configured to provide the body portion of the active component with an alignment tolerance that is biased toward the center position by the spring-loaded cylinders. Thus, the centering mechanisms allow the receptacles to move to the extent permitted by the elasticity of the springs. The first connector set and protruding portions can thereby be allowed to 'jiggle', wobble, vibrate or otherwise be jostled or experience other normal micro-motions that can be expected to occur during vehicle operation and/or docking, and are able to withstand the associated mechanical strains that might be applied on the system.

In different embodiments, the tolerance in the vertical and horizontal positions for each component can vary. That is, the degree to which the active component and/or passive component can be misaligned relative to one another in the horizontal or vertical directions as they are brought closer together can vary. Generally, the tolerance may be determined by various factors including the dimensions of each component and mating set as well as the specific geometry of the interior sidewalls of each receptacle that are intended to guide the protruding portions towards a centrally aligned position. As a non-limiting example, the first alignment system for the passive component may have an approximately ±20-30 mm alignment tolerance, and the second alignment system for the active component may have an approximately ±10-20 mm alignment tolerance, though in other embodiments, the tolerances can be smaller or greater.

Figure 12:
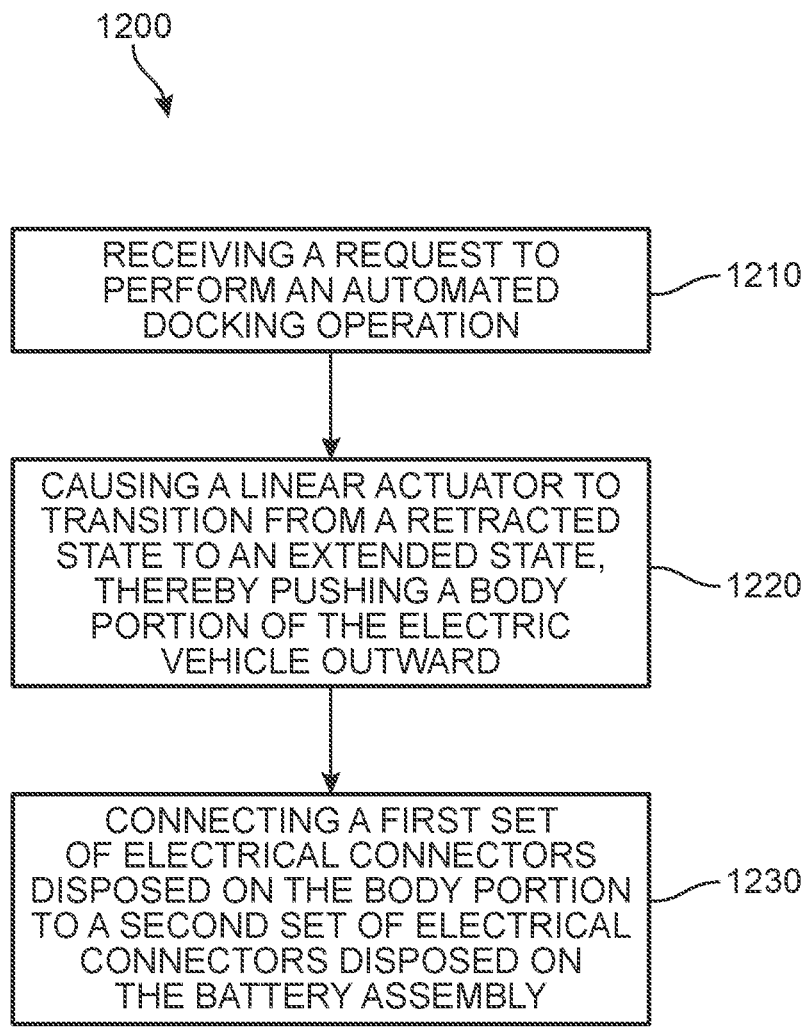
FIG. 12 is a flow chart presenting an embodiment of a method of automatically connecting a battery assembly to an electric vehicle.

FIG. 12 is a flow chart illustrating an embodiment of a method 1200 of automatically connecting a battery assembly to an electric vehicle. The method 1200 includes a first step 1210 of receiving a request to perform an automated docking operation. In addition, a second step 1220 includes causing, in response to the request, a linear actuator to transition from a retracted state to an extended state. As a result, a body portion of the electric vehicle is pushed distally outward. In a third step 1230, the method 1200 includes automatically connecting a first set of electrical connectors disposed on the body portion to a second set of electrical connectors disposed on the battery assembly, thereby providing power to the electric vehicle.

In other embodiments, the method may include additional steps or aspects. As one example, the method may also include steps of arranging the battery assembly and the electric vehicle such that a female interface of the battery assembly and a male interface of the electric vehicle are directly facing one another, and moving the battery assembly such that there is a gap of less than ten inches between the male interface and the female interface. In another example, the method may also include steps of determining that a first protruding portion of the body portion has been received by a first receptacle of the battery assembly based on linear telemetry provided by the linear actuator, and generating a signal indicating that the battery assembly has successfully docked with the electric vehicle.

In some embodiments the method can further comprise steps of receiving a request to perform an automated undocking operation, causing, in response to the request, the linear actuator to transition from the extended state to the retracted state, thereby pulling the body portion of the electric vehicle proximally inward, and automatically separating the first set of electrical connectors from the second set of electrical connectors, thereby disconnecting the battery assembly from the electric vehicle. In such cases, the method can also include determining that a first protruding portion of the body portion has exited a first receptacle of the battery assembly based on linear telemetry provided by the linear actuator, and generating a signal indicating that the battery assembly has successfully disengaged from the electric vehicle in response to the determination.

While various embodiments of the invention have been described, the description is intended to be exemplary, rather than limiting, and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. A vehicle including a connector interface for docking with a battery assembly, the connector interface comprising:
   an upper region, a lower region, and an intermediate region disposed between the upper region and the lower region;
   an outer perimeter with a substantially rectangular shape surrounding the upper region, intermediate region, and lower region;
   a first protruding portion disposed along a first corner portion in the upper region;
   a second protruding portion disposed along a second corner portion in the lower region that is diagonally opposite to the first corner portion; and
   a first connector panel and a second connector panel disposed adjacent to one another in the intermediate region;
   wherein the first connector panel is configured to receive power from a first battery pack and the second connector panel is configured to receive power from a second battery pack when the connector interface is docked to the battery assembly.

2. The vehicle of claim 1, wherein the interface further comprises a third connector panel disposed along a third corner portion in the upper region.

3. The vehicle of claim 2, wherein the interface further comprises a fourth connector panel disposed along a fourth corner portion in the lower region that is diagonally opposite to the third corner portion.

4. The vehicle of claim 1, wherein the two protruding portions and two connector panels are in an arrangement relative to one another that remains the same following a rotation of the connector interface by 180 degrees.

5. The vehicle of claim 1, wherein the first connector panel includes five socket elements arranged in a "C"-shape, and the second connector panel includes five socket elements arranged in a "reverse C"-shape.

6. The vehicle of claim 5, wherein the first connector panel and the second connector panel are symmetric with one another respective to a vertical midline extending between them.

7. The vehicle of claim 3, wherein the first protruding portion includes an elongated cylindrical region extending between a base region at its proximal end and a tapered region at its distal end, and the tapered region terminates in an apex.

8. A battery assembly including a connector interface for connection to a vehicle, the connector interface comprising:
an upper region, a lower region, and an intermediate region disposed between the upper region and the lower region;
an outer perimeter with a substantially rectangular shape surrounding the upper region, intermediate region, and lower region;
a first receptacle disposed along a first corner portion in the upper region;
a second receptacle disposed along a second corner portion in the lower region that is diagonally opposite to the first corner portion; and
a first connector grid and a second connector grid disposed adjacent to one another in the intermediate region;
wherein the first connector grid is configured to transfer power from a first battery pack of the battery assembly and the second connector grid is configured to transfer power from a second battery pack of the battery assembly when the connector interface is docked to the vehicle.

9. The battery assembly of claim 8, wherein the interface further comprises a third connector grid disposed along a third corner portion in the upper region.

10. The battery assembly of claim 9, wherein the interface further comprises a fourth connector grid disposed along a fourth corner portion in the lower region that is diagonally opposite to the third corner portion.

11. The battery assembly of claim 8, wherein the two receptacles and two connector grids are in an arrangement relative to one another that remains the same following a rotation of the connector interface by 180 degrees.

12. The battery assembly of claim 8, wherein the first connector grid includes five pin elements arranged in a "C"-shape, and the second connector grid includes five pin elements arranged in a "reverse C"-shape.

13. The battery assembly of claim 12, wherein the first connector grid and the second connector grid are symmetric with one another respective to a vertical midline extending between them.

14. The battery assembly of claim 10, wherein the first receptacle includes an elongated, hollow cylindrical tube extending from a first end to a second end, and the second end comprises an opening defined by a conical outer rim portion.

15. A system for connecting a battery to a vehicle, the system comprising:
a male connector interface including:
an upper region, a lower region, and an intermediate region disposed between the upper region and the lower region,
an outer perimeter with a substantially rectangular shape surrounding the upper region, intermediate region, and lower region,
a first protruding portion disposed along a first corner portion in the upper region,
a second protruding portion disposed along a second corner portion in the lower region that is diagonally opposite to the first corner portion, and
a first connector panel and a second connector panel disposed adjacent to one another in the intermediate region;
a female connector interface configured to dock with the male connector interface, the female connector interface including:
an upper region, a lower region, and an intermediate region disposed between the upper region and the lower region,
an outer perimeter with a substantially rectangular shape surrounding the upper region, intermediate region, and lower region,
a first receptacle disposed along a first corner portion in the upper region,
a second receptacle disposed along a second corner portion in the lower region that is diagonally opposite to the first corner portion, and
a first connector grid and a second connector grid disposed adjacent to one another in the intermediate region; and
wherein:
the first protruding portion is configured to be snugly received by the first receptacle when the female connector interface is docked with the male connector interface, and
the first connector panel is configured to align with and connect to the first connector grid when the female connector interface is docked with the male connector interface.

16. The system of claim 15, wherein the male connector interface is provided along an exterior of an electric vehicle, and the female connector interface is provided along an exterior of a battery assembly.

17. The system of claim 15, wherein the male connector interface further comprises a third connector panel disposed along a third corner portion in the upper region and a fourth connector panel disposed along a fourth corner portion in the lower region that is diagonally opposite to the third corner portion.

18. The system of claim 17, wherein:
the female interface further comprises a third connector grid disposed along a third corner portion in the upper region, and a fourth connector grid disposed along a fourth corner portion in the lower region that is diagonally opposite to the third corner portion,
the third connector panel is configured to align with and connect to the third connector grid when the female connector interface is docked with the male connector interface, and
the fourth connector panel is configured to align with and connect to the fourth connector grid when the female connector interface is docked with the male connector interface.

* * * * *